US011885929B2

(12) United States Patent
Omenetto

(10) Patent No.: US 11,885,929 B2
(45) Date of Patent: Jan. 30, 2024

(54) HIERARCHICAL PHOTONIC CRYSTALS AND METHODS OF MAKING THE SAME

(71) Applicant: Trustees of Tufts College, Medford, MA (US)

(72) Inventor: Fiorenzo G. Omenetto, Lexington, MA (US)

(73) Assignee: Trustees of Tufts College, Medford, MA (US)

( * ) Notice: Subject to any disclaimer, the term of this patent is extended or adjusted under 35 U.S.C. 154(b) by 810 days.

(21) Appl. No.: 16/687,565

(22) Filed: Nov. 18, 2019

(65) Prior Publication Data

US 2020/0158911 A1 May 21, 2020

Related U.S. Application Data

(60) Provisional application No. 62/768,646, filed on Nov. 16, 2018, provisional application No. 62/837,693, filed on Apr. 23, 2019.

(51) Int. Cl.
| | |
|---|---|
| *G02B 1/00* | (2006.01) |
| *B29D 11/00* | (2006.01) |
| *G02B 5/18* | (2006.01) |
| *G02B 6/122* | (2006.01) |
| *B82Y 20/00* | (2011.01) |

(52) U.S. Cl.
CPC ........ *G02B 1/005* (2013.01); *B29D 11/00269* (2013.01); *B29D 11/00365* (2013.01); *B29D 11/00769* (2013.01); *B29D 11/00798* (2013.01); *G02B 5/1876* (2013.01); *G02B 6/1225* (2013.01); *B29K 2089/00* (2013.01); *B29K 2995/0018* (2013.01); *B29K 2995/0041* (2013.01); *B82Y 20/00* (2013.01); *G02B 2207/101* (2013.01)

(58) Field of Classification Search
CPC .... G02B 1/005; G02B 5/1876; G02B 6/1225; B29D 11/00365; B29D 11/00269; B29D 11/00798; B29D 11/00769
See application file for complete search history.

(56) References Cited

U.S. PATENT DOCUMENTS

| 2013/0329281 A1* | 12/2013 | Liu | G02B 5/26 |
| | | | 359/884 |
| 2014/0334005 A1* | 11/2014 | Omenetto | G02B 1/005 |
| | | | 977/773 |

FOREIGN PATENT DOCUMENTS

JP 2003-270417 * 9/2003

OTHER PUBLICATIONS

Lu, Qiang, et al. "Degradation mechanism and control of silk fibroin." Biomacromolecules 12.4 (2011): 1080-1086.
(Continued)

*Primary Examiner* — Mathieu D Vargot
(74) *Attorney, Agent, or Firm* — GTC Law Group PC & Affiliates

(57) ABSTRACT

The present disclosure provides a composition comprising a hierarchical opal that exhibits structural color when exposed to incident electromagnetic radiation. The hierarchical opal comprises nanoscale periodic cavities separated by a lattice constant, and includes a surface having grooves. The grooves may form a diffractive optical element on the surface of the hierarchical opal, such as a diffuser, a diffraction grating, a beamsplitter, a beam displacement opic, a Fresnel lens, and a micro lens, among others.

32 Claims, 12 Drawing Sheets

(56) References Cited

OTHER PUBLICATIONS

Lu, Yijie, et al. "Electrically tunable block copolymer photonic crystals with a full color display." Journal of Materials Chemistry 19.33 (2009): 5952-5955.
Mannoor, Manu S., et al. "Graphene-based wireless bacteria detection on tooth enamel." Nature communications 3 (2012): 763, 9 pages.
Meng, Yao, et al. "Patterned and iridescent plastics with 3D inverse opal structure for anticounterfeiting of the banknotes." Advanced Optical Materials 6.8 (2018): 1701351, 7 pages.
Mille, Christian, Eric C. Tyrode, and Robert W. Corkery. "3D titania photonic crystals replicated from gyroid structures in butterfly wing scales: approaching full band gaps at visible wavelengths." RSC advances 3.9 (2013): 3109-3117.
Nam, Hyunmoon, et al. "Inkjet printing based mono-layered photonic crystal patterning for anti-counterfeiting structural colors." Scientific reports 6 (2016): 30885, 9 pages.
Oh, Jeong Rok, et al. "Fabrication of wafer-scale polystyrene photonic crystal multilayers via the layer-by-layer scooping transfer technique." Journal of Materials Chemistry 21.37 (2011): 14167-14172.
Ozaki, Masanori, et al. "Electric field tuning of the stop band in a liquid-crystal-infiltrated polymer inverse opal." Advanced Materials 14.7 (2002): 514-518.
Park, Jungho, et al. "Direct-write fabrication of colloidal photonic crystal microarrays by ink-jet printing." Journal of colloid and interface science 298.2 (2006): 713-719.
Parker, Andrew R., and Helen E. Townley. "Biomimetics of photonic nanostructures." Nature nanotechnology 2.6 (2007): 347, 7 pages.
Peng, Chang-Yi, et al. "Flexible photonic crystal material for multiple anticounterfeiting applications." ACS applied materials & interfaces 10.11 (2018): 9858-9864.
Phillips, Katherine R., et al. "A colloidoscope of colloid-based porous materials and their uses." Chemical Society Reviews 45.2 (2016): 281-322.
Phillips, Katherine R., et al. "Tunable anisotropy in inverse opals and emerging optical properties." Chemistry of Materials 26.4 (2014): 1622-1628.
Potyrailo, Radislav A., et al. "Morpho butterfly wing scales demonstrate highly selective vapour response." Nature Photonics 1.2 (2007): 123-128.
Querini, Marco, et al. "2D Color Barcodes for Mobile Phones." IJCSA 8.1 (2011): 136-155.
Rockwood, Danielle N., et al. "Materials fabrication from Bombyx mori silk fibroin." Nature protocols 6.10 (2011): 1612, 20 pages.
Saito, Akira, et al. "Reproduction of the Morpho blue by nanocasting lithography." Journal of Vacuum Science & Technology B: Microelectronics and Nanometer Structures Processing, Measurement, and Phenomena 24.6 (2006): 3248-3251.
Schaffner, Manuel, et al. "Combining Bottom-Up Self-Assembly with Top-Down Microfabrication to Create Hierarchical Inverse Opals with High Structural Order." Small 11.34 (2015): 4334-4340.
Shim, Tae Soup, et al. "Dynamic modulation of photonic bandgaps in crystalline colloidal arrays under electric field." Advanced Materials 22.40 (2010): 4494-4498.
Siddique, Radwanul Hasan, Guillaume Gomard, and Hendrik Hölscher. "The role of random nanostructures for the omnidirectional anti-reflection properties of the glasswing butterfly." Nature communications 6.1 (2015): 6909, 8 pages.
Singh S., "Qr Code Analysis", Int. J. Adv. Res. Comp. Sci. and Software Eng., vol. 6, Issue 5, May 2016, 89-92.
Singh, Madhusudan, et al. "Inkjet printing-process and its applications." Advanced materials 22.6 (2010): 673-685.
Srinivasarao, Mohan. "Nano-optics in the biological world: beetles, butterflies, birds, and moths." Chemical reviews 99.7 (1999): 1935-1962.
Sweeney, Alison, Christopher Jiggins, and Sönke Johnsen. "Polarized light as a butterfly mating signal." Nature 423.6935 (2003): 31-32.
Szendrei-Temesi, Katalin, et al. "Lithium tin sulfide—a high-refractive-index 2D material for humidity-responsive photonic crystals." Advanced Functional Materials 28.14 (2018): 1705740, 10 pages.
Tao, Hu, David L. Kaplan, and Fiorenzo G. Omenetto. "Silk materials—a road to sustainable high technology." Advanced materials 24.21 (2012): 2824-2837.
Tao, Hu, et al. "Implantable, multifunctional, bioresorbable optics." Proceedings of the National Academy of Sciences 109.48 (2012): 19584-19589.
Tao, Hu, et al. "Inkjet printing of regenerated silk fibroin: From printable forms to printable functions." Advanced materials 27.29 (2015): 4273-4279.
Tao, Hu, et al. "Silk-based conformal, adhesive, edible food sensors." Advanced Materials 24.8 (2012): 1067-1072.
Tao, Hu, et al. "Silk-based resorbable electronic devices for remotely controlled therapy and in vivo infection abatement." Proceedings of the National Academy of Sciences 111.49 (2014): 17385-17389.
Teyssier, Jérémie, et al. "Photonic crystals cause active colour change in chameleons." Nature communications 6 (2015): 6368, 7 pages.
Vogel, Nicolas, et al. "A Convenient Method to Produce Close-and Non-close-Packed Monolayers using Direct Assembly at the Air-Water Interface and Subsequent Plasma-Induced Size Reduction." Macromolecular Chemistry and Physics 212.16 (2011): 1719-1734.
Vogel, Nicolas, et al. "Advances in colloidal assembly: the design of structure and hierarchy in two and three dimensions." Chemical reviews 115.13 (2015): 6265-6311.
Vogel, Nicolas, et al. "Color from hierarchy: Diverse optical properties of micron-sized spherical colloidal assemblies." Proceedings of the National Academy of Sciences 112.35 (2015): 10845-10850.
Vukusic, P., et al. "Quantified interference and diffraction in single Morpho butterfly scales." Proceedings of the Royal Society of London. Series B: Biological Sciences 266.1427 (1999): 1403-1411.
Vukusic, P., J. R. Sambles, and C. R. Lawrence. "Structurally assisted blackness in butterfly scales." Proceedings of the Royal Society of London. Series B: Biological Sciences 271.suppl_4 (2004): S237-S239.
Vukusic, Pete, and J. Roy Sambles. "Photonic structures in biology." Nature 424.6950 (2003): 852-855.
Vukusic, Pete, Benny Hallam, and Joe Noyes. "Brilliant whiteness in ultrathin beetle scales." Science 315.5810 (2007): 348-348.
Vukusic, Peter, J. R. Sambles, and C. R. Lawrence. "Colour mixing in wing scales of a butterfly." Nature 404.6777 (2000): 457-457.
Wang, Jingxia, et al. "Patterned photonic crystals fabricated by inkjet printing." Journal of Materials Chemistry C 1.38 (2013): 6048-6058.
Wang, Wentao, et al. "Magnetochromic photonic hydrogel for an alternating magnetic field-responsive color display." Advanced Optical Materials 6.4 (2018): 1701093, 9 pages.
Wang, Yu, et al. "Understanding the mechanical properties and structure transition of antheraea pernyi silk fiber induced by its contraction." Biomacromolecules 19.6 (2018): 1999-2006.
Whitney, Heather M., et al. "Floral iridescence, produced by diffractive optics, acts as a cue for animal pollinators." Science 323.5910 (2009): 130-133.
Aizenberg, Joanna, et al. "Calcitic microlenses as part of the photoreceptor system in brittlestars." Nature 412.6849 (2001): 819-822.
Angeley, David G., Jon Davis, and Gil Reitz. "Fabrication of an optical-quality linear grating of immunoglobulin G proteins by microcontact printing and demonstration of potential biosensing applications." Optical Engineering 45.4 (2006): 043402, 8 pages.
Arsenault, André C., et al. "Photonic-crystal full-colour displays." Nature Photonics 1.8 (2007): 468-472.
Bai, Ling, et al. "Bio-inspired vapor-responsive colloidal photonic crystal patterns by inkjet printing." ACS nano 8.11 (2014): 11094-11100.
Barrera, John Fredy, Alejandro Mira, and Roberto Torroba. "Optical encryption and QR codes: secure and noise-free information retrieval." Optics express 21.5 (2013): 5373-5378.

(56) References Cited

OTHER PUBLICATIONS

Burgess, Ian B., et al. "Encoding complex wettability patterns in chemically functionalized 3D photonic crystals." Journal of the American Chemical Society 133.32 (2011): 12430-12432.
Burgess, Ian B., Joanna Aizenberg, and Marko Lonar. "Creating bio-inspired hierarchical 3D-2D photonic stacks via planar lithography on self-assembled inverse opals." Bioinspiration & biomimetics 8.4 (2013): 045004, 6 pages.
Chen, Ke, et al. "Multicolor Printing Using Electric-Field-Responsive and Photocurable Photonic Crystals." Advanced Functional Materials 27.43 (2017): 1702825, 8 pages.
Chung, Kyungjae, et al. "Flexible, angle-independent, structural color reflectors inspired by morpho butterfly wings." Advanced Materials 24.18 (2012): 2375-2379.
Deegan, Robert D., et al. "Capillary flow as the cause of ring stains from dried liquid drops." Nature 389.6653 (1997): 827-829.
Dumanli, Ahu Gümrah, and Thierry Savin. "Recent advances in the biomimicry of structural colours." Chemical Society Reviews 45.24 (2016): 6698-6724.
England, Grant T., and Joanna Aizenberg. "Emerging optical properties from the combination of simple optical effects." Reports on Progress in Physics 81.1 (2017): 016402, 13 pages.
England, Grant, et al. "Bioinspired micrograting arrays mimicking the reverse color diffraction elements evolved by the butterfly Pierella luna." Proceedings of the National Academy of Sciences 111.44 (2014): 15630-15634.
Forster, Jason D., et al. "Biomimetic isotropic nanostructures for structural coloration." Advanced Materials 22.26-27 (2010): 2939-2944.
Fu, Qianqian, Huimin Zhu, and Jianping Ge. "Electrically tunable liquid photonic crystals with large dielectric contrast and highly saturated structural colors." Advanced Functional Materials 28.43 (2018): 1804628, 9 pages.
Galusha, Jeremy W., Matthew R. Jorgensen, and Michael H. Bartl. "Diamond-structured titania photonic-bandgap crystals from biological templates." Advanced materials 22.1 (2010): 107-110.
Gan, Zongsong, Mark D. Turner, and Min Gu. "Biomimetic gyroid nanostructures exceeding their natural origins." Science advances 2.5 (2016): e1600084, 7 pages.
Ge, Jianping, and Yadong Yin. "Magnetically responsive colloidal photonic crystals." Journal of Materials Chemistry 18.42 (2008): 5041-5045.
Han, Zhiwu, et al. "Light trapping structures in wing scales of butterfly Trogonoptera brookiana." Nanoscale 4.9 (2012): 2879-2883.
Heo, Yongjoon, et al. "Lithographically Encrypted Inverse Opals for Anti-Counterfeiting Applications." Small 12.28 (2016): 3819-3826.
Heydari, Esmaeil, et al. "Plasmonic Color Filters as Dual-State Nanopixels for High-Density Microimage Encoding." Advanced Functional Materials 27.35 (2017): 1701866, 6 pages.
Hou, Jue, Mingzhu Li, and Yanlin Song. "Patterned colloidal photonic crystals." Angewandte Chemie International Edition 57.10 (2018): 2544-2553.
Matsubara et al. Angew Chem Int Ed Engl. 2007;46(10):1688-92.
Kim, S. H., Park, H. S., Choi, J. H., Shim, J. W., & Yang, S. M. (2010). Integration of colloidal photonic crystals toward miniaturized spectrometers. Advanced Materials, 22(9), 946-950.
Kolle, M. et al. "Bio-inspired bandgap tunable elastic optical multilayer fibers," Adv. Mater. 25.15 (2013): 2239-2245.
Kolle, Mathias, et al. "Mimicking the colourful wing scale structure of the Papilio blumei butterfly." Nature nanotechnology 5.7 (2010): 511-515.
Kowalonek, Jolanta, Halina Kaczmarek, and Marzanna Kurzawa. "Effect of UV-irradiation on fluorescence of poly (methyl methacrylate) films with photosensitive organic compounds." Journal of Photochemistry and Photobiology A: Chemistry 319 (2016): 18-24.
Kuang, Minxuan, et al. "Inkjet printing patterned photonic crystal domes for wide viewing-angle displays by controlling the sliding three phase contact line." Advanced Optical Materials 2.1 (2014): 34-38.

Kuang, Minxuan, Jingxia Wang, and Lei Jiang. "Bio-inspired photonic crystals with superwettability." Chemical Society Reviews 45.24 (2016): 6833-6854.
Kwon, Young Woo, et al. "Flexible near-field nanopatterning with ultrathin, conformal phase masks on nonplanar substrates for biomimetic hierarchical photonic structures." ACS nano 10.4 (2016): 4609-4617.
Lee, HanGyeol, et al. "Designing multicolor micropatterns of inverse opals with photonic bandgap and surface plasmon resonance." Advanced Functional Materials 28.18 (2018): 1706664, 10 pages.
Lee, Joon-Seok, Kwanghwi Je, and Shin-Hyun Kim. "Designing multicolored photonic micropatterns through the regioselective thermal compression of inverse opals." Advanced Functional Materials 26.25 (2016): 4587-4594.
Lee, S-K., et al. "Pixellated photonic crystal films by selective photopolymerization." Advanced Materials 18.16 (2006): 2111-2116.
Lee, Su Yeon, et al. "Controlled Pixelation of Inverse Opaline Structures Towards Reflection-Mode Displays." Advanced Materials 26.15 (2014): 2391-2397.
Leo, Sin-Yen, et al. "Chromogenic Photonic Crystal Sensors Enabled by Multistimuli-Responsive Shape Memory Polymers." Small 14.12 (2018): 1703515, 10 pages.
Li, Wen-Song, et al. "Demonstration of patterned polymer-stabilized cholesteric liquid crystal textures for anti-counterfeiting two-dimensional barcodes." Applied optics 56.3 (2017): 601-606.
Li, Yanan, et al. "Patterned photonic crystals for hiding information." Journal of Materials Chemistry C 5.19 (2017): 4621-4628.
Liu, Xiangjiang, et al. "Flexible Plasmonic Metasurfaces with User-Designed Patterns for Molecular Sensing and Cryptography." Advanced Functional Materials 26.30 (2016): 5515-5523.
Armstrong, Eileen, and Colm O'Dwyer. "Artificial opal photonic crystals and inverse opal structures-fundamentals and applications from optics to energy storage." Journal of materials chemistry C 3.24 (2015): 6109-614.
Derby, Brian. "Inkjet printing of functional and structural materials: fluid property requirements, feature stability, and resolution." Annual Review of Materials Research 40 (2010): 395-414.
Ding, Tao, Stoyan K. Smoukov, and Jeremy J. Baumberg. "Stamping colloidal photonic crystals: a facile way towards complex pixel colour patterns for sensing and displays." Nanoscale 7.5 (2015): 1857-1863.
Guo, Jin, et al. "Coding cell micropatterns through peptide inkjet printing for arbitrary biomineralized architectures." Advanced Functional Materials 28.19 (2018): 1800228.
Hu, Xiao, David Kaplan, and Peggy Cebe. "Determining beta-sheet crystallinity in fibrous proteins by thermal analysis and infrared spectroscopy." Macromolecules 39.18 (2006): 6161-6170.
Hu, Xiao, et al. "Regulation of silk material structure by temperature-controlled water vapor annealing." Biomacromolecules 12.5 (2011): 1686-1696.
Hwang, Suk-Won, et al. "A physically transient form of silicon electronics." Science 337.6102 (2012): 1640-1644.
Jin, H-J., et al. "Water-stable silk films with reduced ß-sheet content." Advanced Functional Materials 15.8 (2005): 1241-1247.
Kim, Dae-Hyeong, et al. "Dissolvable films of silk fibroin for ultrathin conformal bio-integrated electronics." Nature materials 9.6 (2010): 511-517.
Kim, Hyoki, et al. "Structural colour printing using a magnetically tunable and lithographically fixable photonic crystal." Nature Photonics 3.9 (2009): 534-540.
Kim, Sunghwan, et al. "All-water-based electron-beam lithography using silk as a resist." Nature nanotechnology 9.4 (2014): 306.
Kim, Sunghwan, et al. "Silk inverse opals." Nature Photonics 6.12 (2012): 818-823.
Lu, Qiang, et al. "Water-insoluble silk films with silk I structure." Acta biomaterialia 6.4 (2010): 1380-1387.
Mondia, Jessica P., et al. "Rapid nanoimprinting of doped silk films for enhanced fluorescent emission." Advanced Materials 22.41 (2010): 4596-4599.
Omenetto, Fiorenzo G., and David L. Kaplan. "A new route for silk." Nature Photonics 2.11 (2008): 641-643.

(56) References Cited

OTHER PUBLICATIONS

Omenetto, Fiorenzo G., and David L. Kaplan. "New opportunities for an ancient material." Science 329.5991 (2010): 528-531.

Rockwood, Danielle N., et al. "Materials fabrication from Bombyx mori silk fibroin." Nature protocols 6.10 (2011): 1612.

Tseng, Peter, et al. "Evaluation of Silk Inverse Opals for "Smart" Tissue Culture." ACS omega 2.2 (2017): 470-477.

Wang, Yu, et al. "Designing the iridescences of biopolymers by assembly of photonic crystal superlattices." Advanced Optical Materials 6.10 (2018): 1800066.

Wang, Yu, et al. "Modulation of multiscale 3D lattices through conformational control: painting silk inverse opals with water and light." Advanced Materials 29.38 (2017): 1702769.

Wilts, Bodo D., et al. "Iridescence and spectral filtering of the gyroid-type photonic crystals in Parides sesostris wing scales." Interface Focus 2.5 (2012): 681-687.

Wu, Suli, et al. "Manipulating luminescence of light emitters by photonic crystals." Advanced Materials 30.47 (2018): 1803362, 7 pages.

Wu, Suli, et al. "Structural color patterns on paper fabricated by inkjet printer and their application in anticounterfeiting." The journal of physical chemistry letters 8.13 (2017): 2835-2841.

Wu, Yuxin, Kai Zhang, and Bai Yang. "Ordered Hybrid Micro/Nanostructures and Their Optical Applications." Advanced Optical Materials 7.7 (2019): 1800980, 30 pages.

Xiao, Ming, et al. "Bioinspired bright noniridescent photonic melanin supraballs." Science advances 3.9 (2017): e1701151, 8 pages.

Xie, Keyu, Min Guo, and Haitao Huang. "Photonic crystals for sensitized solar cells: fabrication, properties, and applications." Journal of Materials Chemistry C 3.41 (2015): 10665-10686.

Yang, Shikuan, et al. "Ultra-antireflective synthetic brochosomes." Nature communications 8.1 (2017), 1285, 8 pages.

Yu, Kuilong, et al. "Biomimetic optical materials: Integration of nature's design for manipulation of light." Progress in Materials Science 58.6 (2013): 825-873.

Zhang, Rui, Qing Wang, and Xu Zheng. "Flexible mechanochromic photonic crystals: routes to visual sensors and their mechanical properties." Journal of Materials Chemistry C 6.13 (2018): 3182-3199.

Zhang, Yuqi, Qianqian Fu, and Jianping Ge. "Test-Paper-Like Photonic Crystal Viscometer." Small 13.13 (2017): 1603351, 7 pages.

Zhong, Kuo, et al. "Instantaneous, simple, and reversible revealing of invisible patterns encrypted in robust hollow sphere colloidal photonic crystals." Advanced Materials 30.25 (2018): 1707246, 8 pages.

Zhou, Zhitao, et al. "Engineering the future of silk materials through advanced manufacturing." Advanced Materials 30.33 (2018): 1706983, 26 pages.

Zhou, Zhitao, et al. "The Use of Functionalized Silk Fibroin Films as a Platform for Optical Diffraction-Based Sensing Applications." Advanced Materials 29.15 (2017): 1605471, 7 pages.

Wang, Y., et al.l. "Designing the Iridescences of Biopolymers by Assembly of Photonic Crystal Superlattices", Adv. Opt. Mater. 2018, 6, 11800066, 7 pages.

* cited by examiner

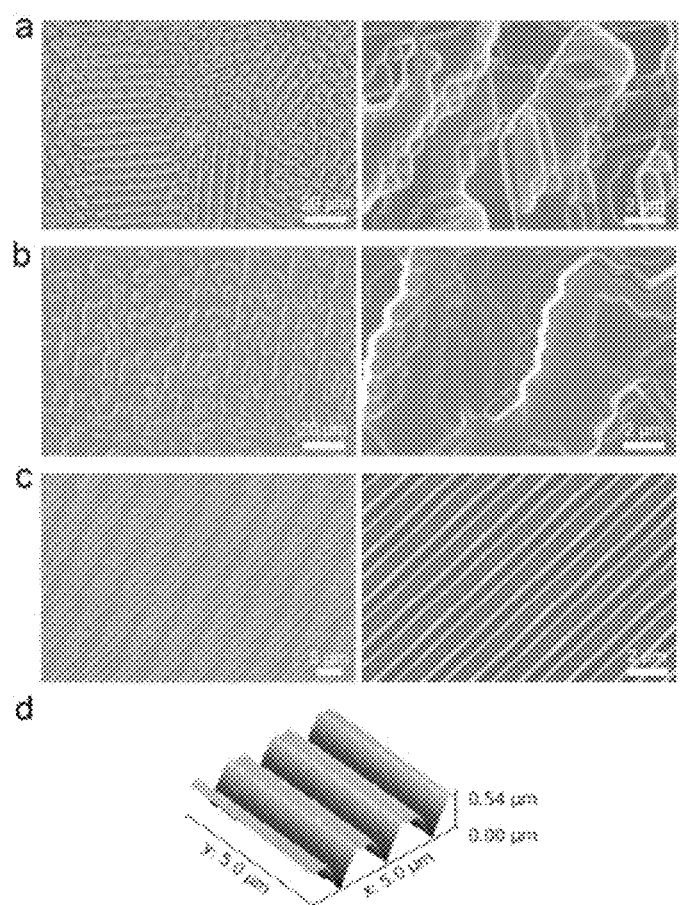
FIG. 5(A-D)

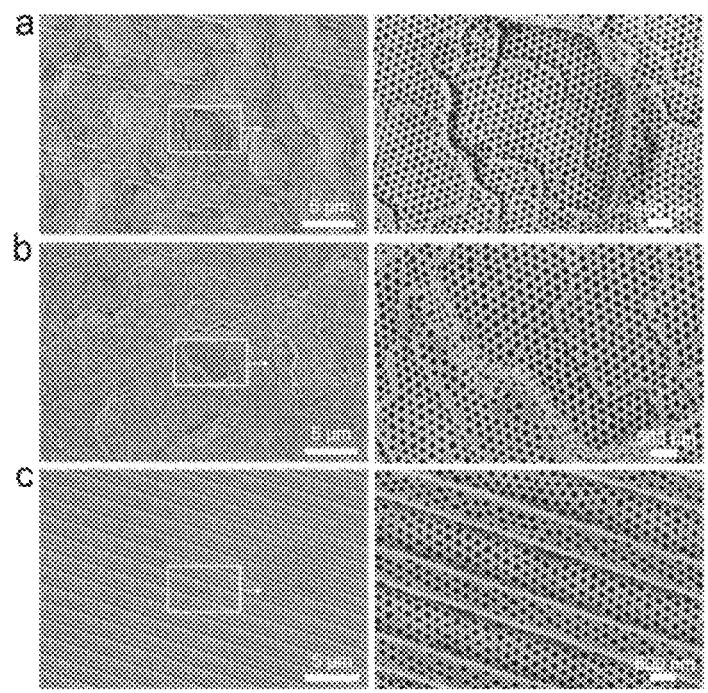
FIG. 6(A-C)

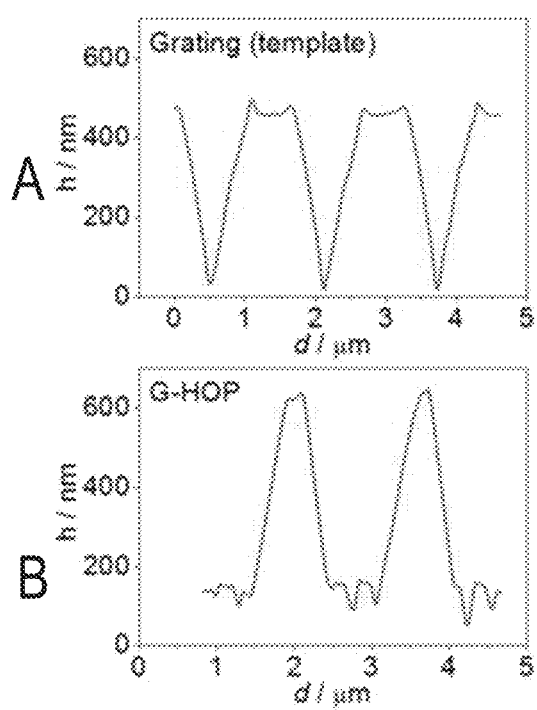
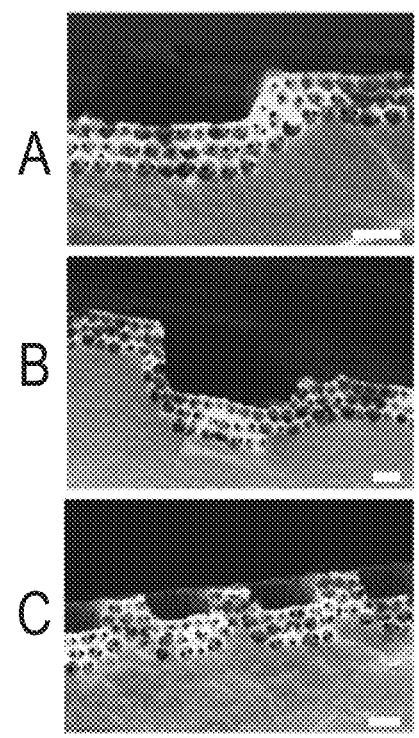
FIG. 7(A-B)  FIG. 8(A-C)

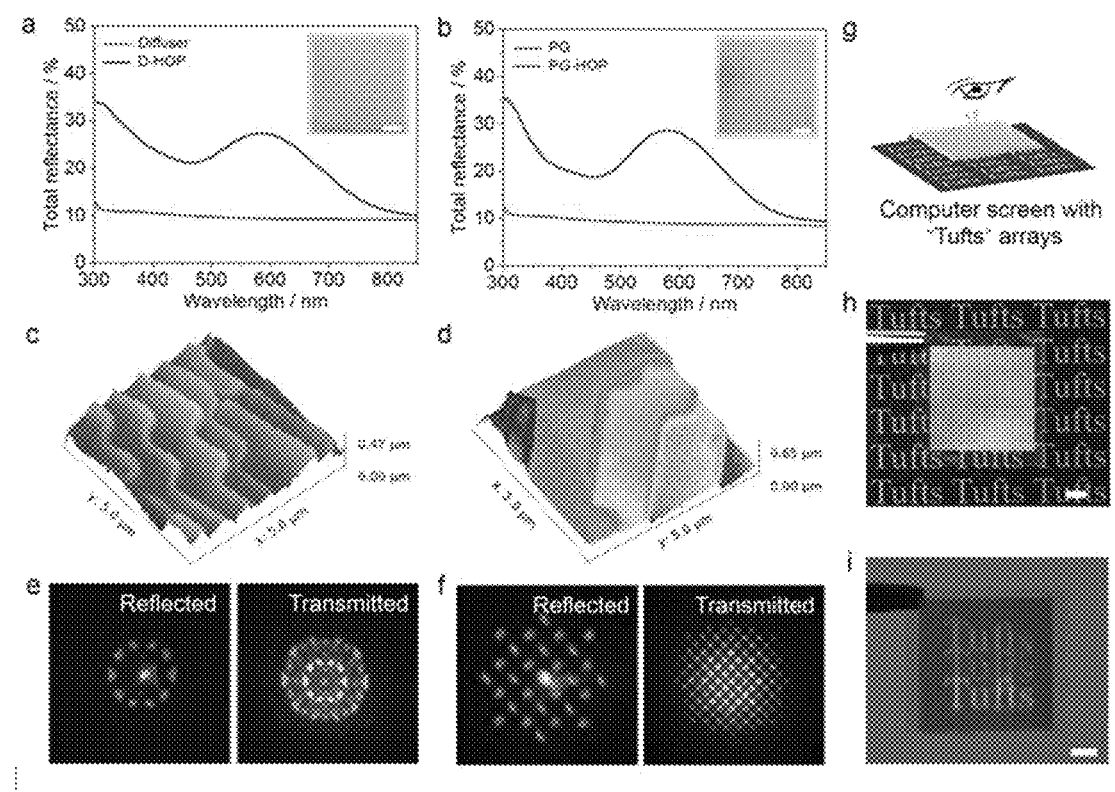
FIG. 9(A-I)

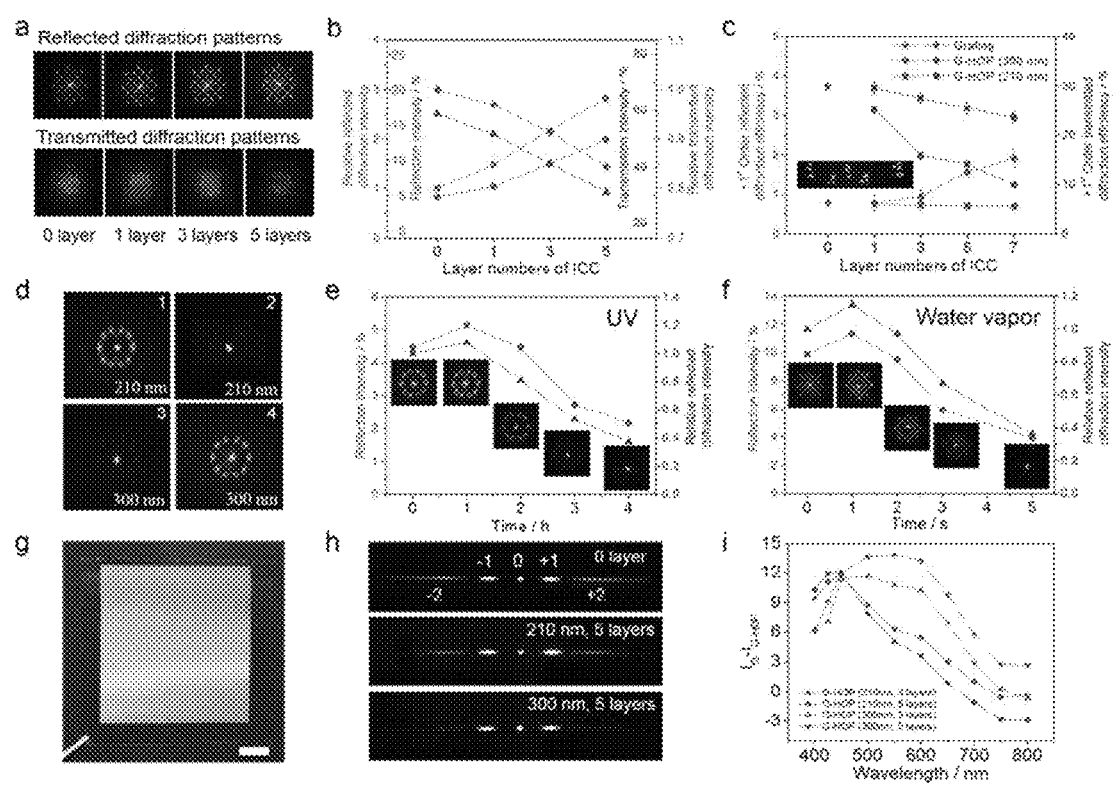
FIG. 10(A-I)

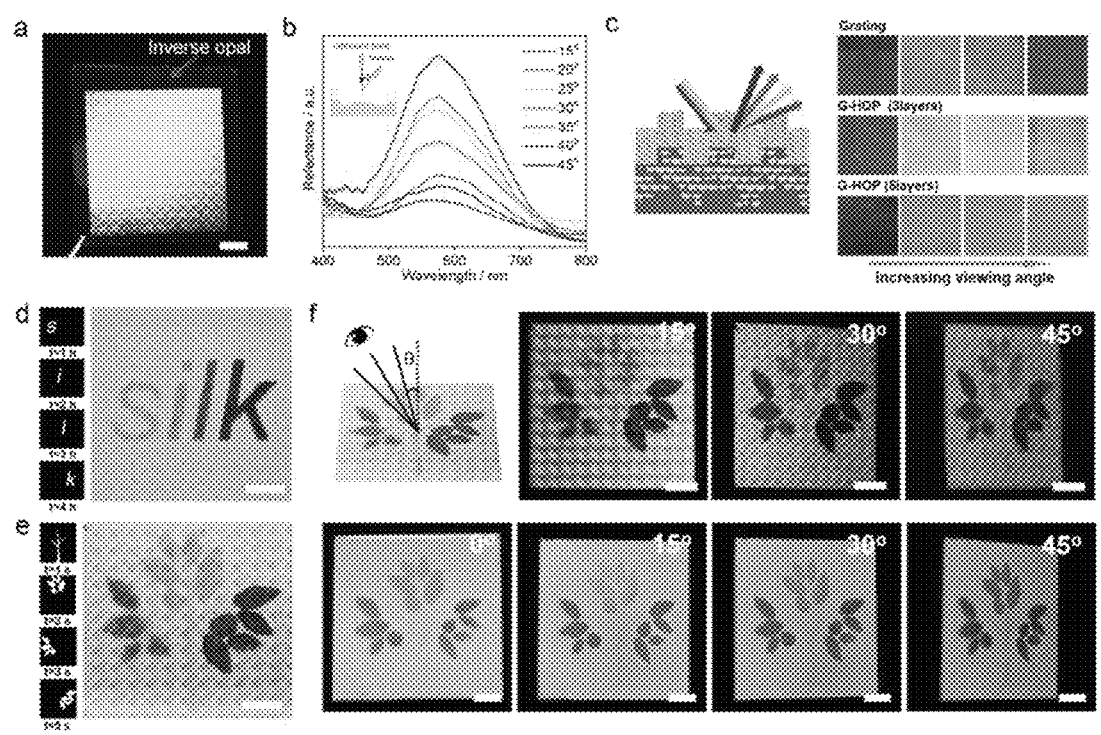
FIG. 11(A-F)

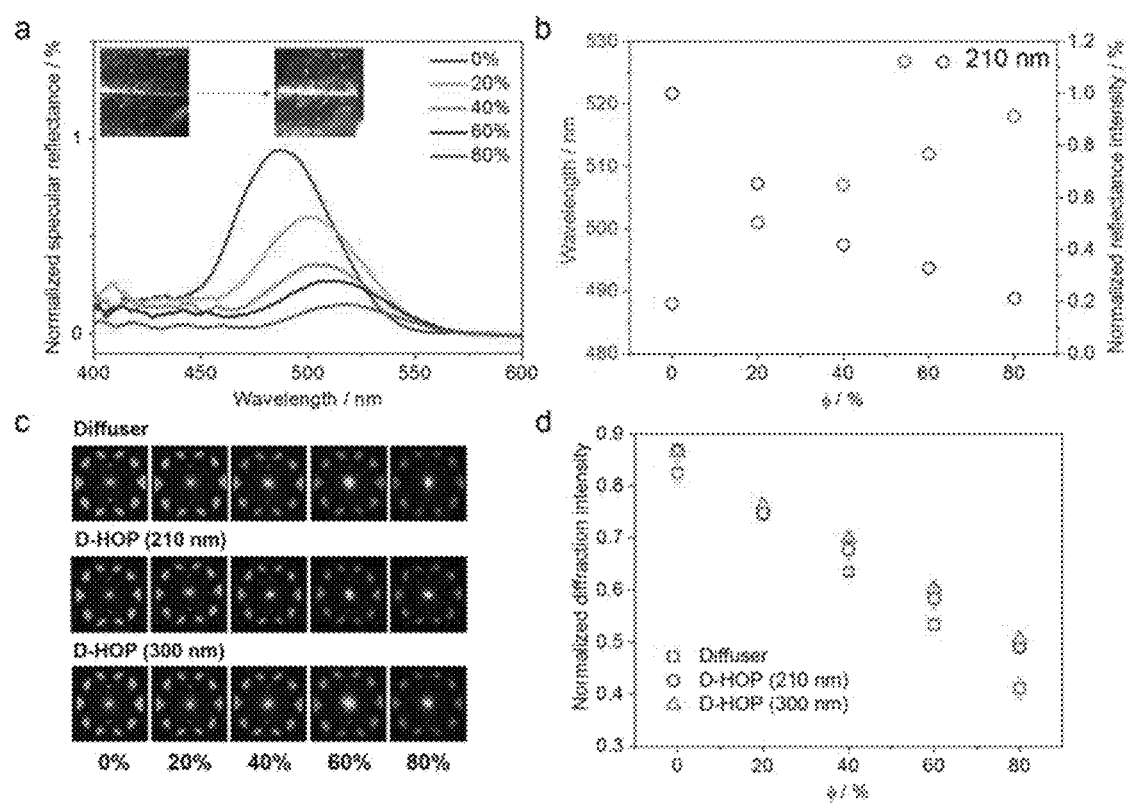
FIG. 12(A-D)

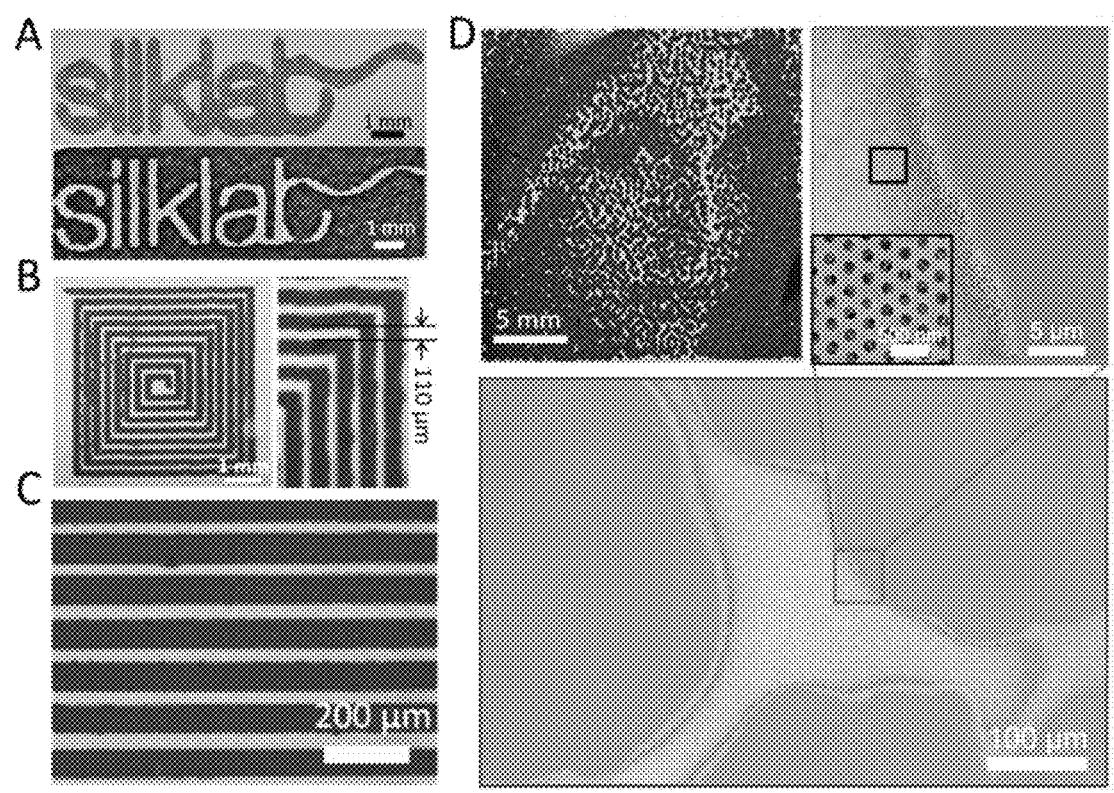
FIG. 13(A-D)

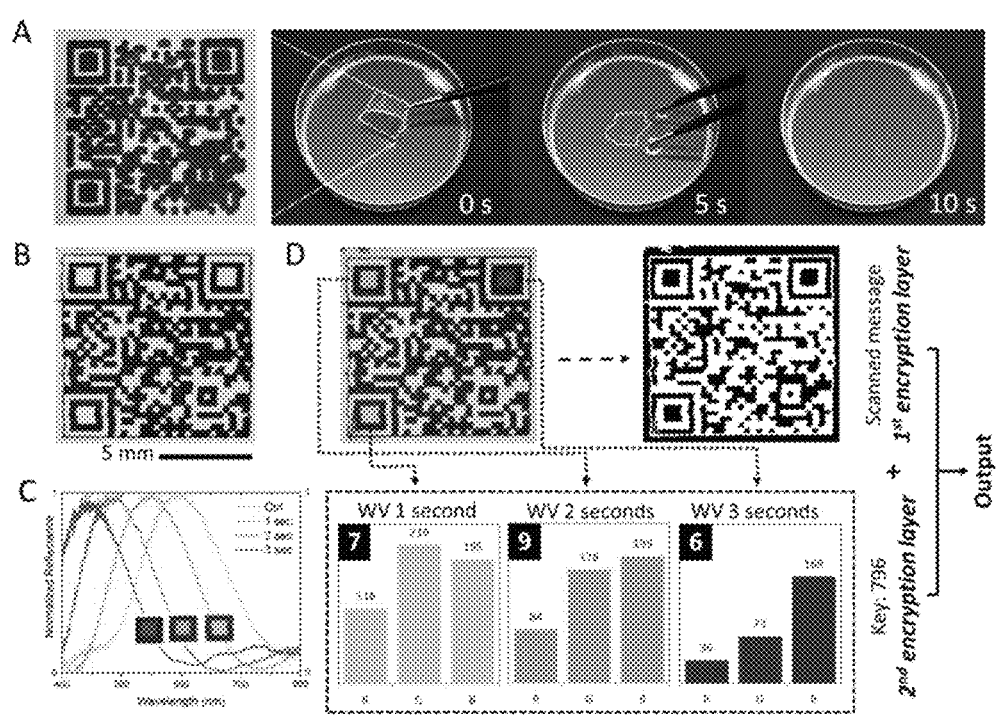
FIG. 14(A-D)

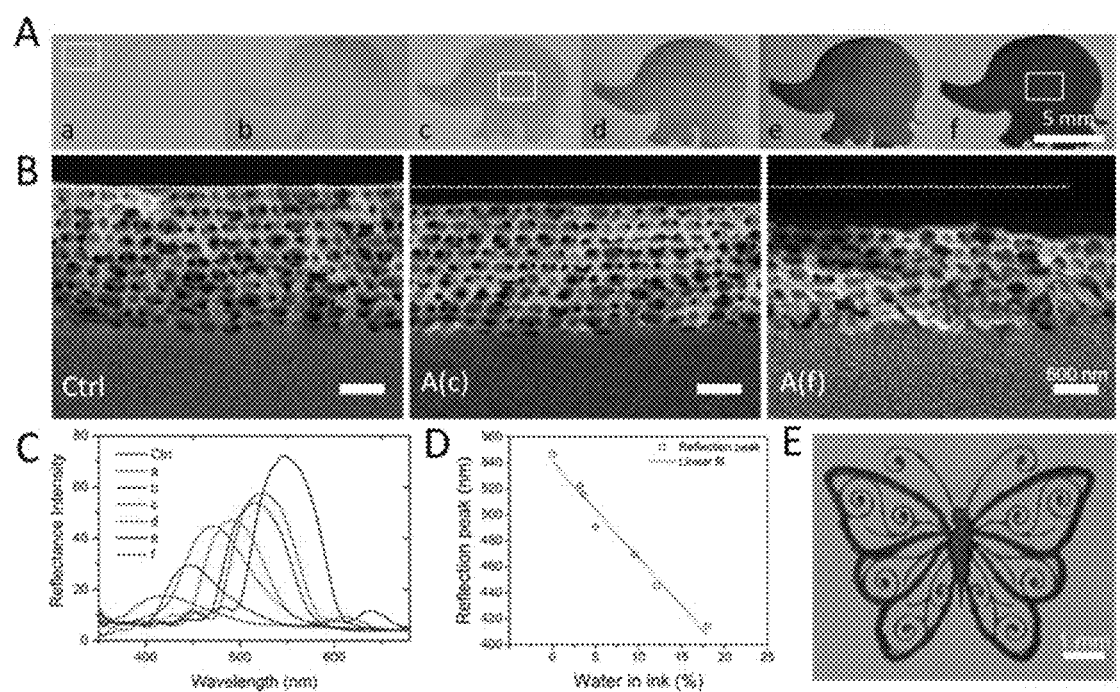
FIG. 15(A-E)

HIERARCHICAL PHOTONIC CRYSTALS AND METHODS OF MAKING THE SAME

CROSS REFERENCE TO RELATED APPLICATIONS

This application claims the priority to U.S. Provisional Application No. 62/768,646 filed Nov. 16, 2018, and U.S. Provisional Application No. 62/837,693 filed Apr. 23, 2019, the contents of each of which are incorporated by reference.

GOVERNMENT SUPPORT

This invention was made with government support under grant N00014-16-1-2437 awarded by the United States Navy. The government has certain rights in the invention.

BACKGROUND

Photonic crystals include periodically repeating internal regions of high and low dielectric constants. Photons propagate through the structure based upon the wavelength of the photons. Photons with wavelengths of light that are allowed to propagate through the structure are called "modes," while photons with wavelengths of light that are not allowed to propagate are called "photonic band gaps." The structure of the photonic crystals define allowed and forbidden electronic energy bands, resulting in spectral selectivity of light.

SUMMARY

In some embodiments, the present disclosure provides a method of forming a hierarchical opal configured to separate wavelengths of light using a diffractive optical element. The method includes applying a silk fibroin solution to a lattice comprising a plurality of particles to fill voids between the plurality of particles. The lattice forming a mold for the hierarchical opal having the diffractive optical element. The method further includes drying the silk fibroin solution into a composite material including the hierarchical opal and the plurality of particles, and removing the plurality of particles to form the hierarchical opal having the diffractive optical element formed on a surface of the hierarchical opal.

In some embodiments, the present disclosure provides a method of forming a hierarchical opal. The method includes applying the silk fibroin solution to a lattice comprising a plurality of particles such that the silk fibroin solution fills voids between the plurality of particles, and drying the silk fibroin solution into a composite material including the hierarchical opal and the plurality of particles. The method further includes removing the plurality of particles to form the hierarchical opal comprising nanoscale periodic cavities separated by a lattice constant. The method further includes applying an aqueous solution to a surface of the hierarchical opal in a patterned formation, where the aqueous solution alters the lattice constant of the nanoscale periodic cavities located in the patterned formation to generate grooves across the surface of the hierarchical opal.

In some embodiments, the present disclosure provides an apparatus comprising a hierarchical silk fibroin opal that exhibits structural color when exposed to incident electromagnetic radiation. The hierarchical silk fibroin opal comprises nanoscale periodic cavities separated by a lattice constant. The hierarchical silk fibroin opal includes a surface having grooves. The grooves may form a diffractive optical element on the surface of the hierarchical silk fibroin opal.

BRIEF DESCRIPTION OF THE DRAWINGS

The following figures depict certain illustrative implementations of the compositions, apparatuses, and methods described herein, where like reference numerals refer to like elements. Each depicted implementation is illustrative of the compositions, apparatuses, and methods and should not be construed to be limited.

FIG. 5(A-D) are surface morphology images of the biologically-based hierarchical opals in accordance with some embodiments of the present disclosure. Panel A (left) is a low-magnification surface SEM image of a diffuser patterned hierarchical opal; Panel A (right) is a high-magnification surface SEM image of a diffuser patterned hierarchical opal; Panel B (left) is a low-magnification surface SEM image of a hierarchical opal having a pattern generator structure; Panel B (right) is a high-magnification surface SEM image of a hierarchical opal having a pattern generator structure; Panel C (left) is a low-magnification surface SEM image of a hierarchical opal having a linear grating with a period of 1.6 μm; Panel C (right) is a high-magnification surface SEM image of a hierarchical opal having a linear grating with a period of 1.6 μm; Panel D is a 3D atomic force microscopy (AFM) image of the grating template.

FIG. 6(A-C) are surface SEM images of hierarchical opals in accordance with some embodiments of the present disclosure. Panel A are SEM images of a diffuser (D-HOP); Panel B are SEM images of a pattern generator (PG-HOP); and Panel C are SEM images of a grating (DG-HOP).

FIG. 7(A-B) are 2D profiles of the surface of a template and the hierarchical opal in accordance with some embodiments of the present disclosure. Panel A is a cross-section profiles of 2D-diffractive surfaces of a template, and panel B is a replicated inverse opal profile.

FIG. 8(A-C) are cross-sectional SEM images of HOPs formed using by using templates of colloidal crystals composed of PS spheres with diameter of 300 nm on different topographically patterned substrates in accordance with some embodiments of the present disclosure. Panel A is a diffuser (D-HOP); Panel B is a pattern generator (PG-HOP); Panel C is a grating (DG-HOP).

FIG. 9(A-I) illustrate integration of structural color and diffraction in the hierarchical opal in accordance with some embodiments of the present disclosure. Panels A-B illustrate total reflectance spectra of D-HOP (Panel A), and PG-HOP (Panel B) with $\Lambda=300$ nm. The spectra of corresponding 2D optical elements are also shown for comparison. Scale bars: 2 mm. Panel C-D illustrate corresponding 3D AFM images of D-HOP (Panel C) and PG-HOP (Panel D). Panels E-F illustrate the projected diffraction patterns in both reflection and transmission modes obtained from propagation of a green laser ($\lambda=543.5$ nm) through D-HOP (Panel E) and PG-HOP (Panel F). Panel G illustrates a schematic of the experimental setup to generate transmitted images of the "Tufts" words through HOPs. Double arrow indicates the separation between the actual image and the sample. H-I) Corresponding transmitted images of the "Tufts" words through D-HOP (Panel H) and G-HOP (Panel I) with $\Lambda=300$ nm. The arrows in Panel H indicate the visible letters through silk inverse opal film. In I, the "Tufts" word in the middle is diffracted to both sides by G-HOP. Scale bars: 2 mm.

FIG. 10(A-I) illustrate diffraction performance modulation of hierarchical opals in accordance with some embodiments of the present disclosure. Panel A) reflected (top) and transmitted (bottom) diffraction patterns of PG-HOPs with different layers of inverse colloidal crystals ($\Lambda=300$ nm) illuminated by a green laser. Panel B) Calculated diffraction, reflection and transmission intensity of PG-HOPs as a function of layer numbers of inverse colloidal crystal. Panel C) Measured+$1^{st}$ order diffraction efficiency of G-HOPs as a function of layer numbers. The samples were illuminated by a green laser. Insert: transmitted diffraction pattern showing different diffraction orders. Panel D) Reflected diffraction patterns of five-layer D-HOPs with $\Lambda=210$ nm (1,2) or $\Lambda=300$ nm (3,4) illuminated by a blue (1,3) or green (2,4) laser. Panels E-F are calculated reflection and diffraction intensity as a function of UV (Panel E) and water vapor (Panel F) treatment time. Inserts show the corresponding reflected diffraction patterns generated by using a green laser illumination. Panel G is a photograph showing the split of a white light beam into its component colors of a G-HOP film with $\Lambda=300$ nm. Scale bar: 2 mm. Panel H is a transmitted diffraction patterns obtained by shining a white light beam through grating and five-layer G-HOPs. Panel I is the transmission intensity (+$1^{st}$ order) difference between grating and G-HOPs ($I_G$–$I_{G\text{-}HOP}$) as a function of wavelength.

FIG. 11(A-F) illustrates structural color tuning at different angles in accordance with the present disclosure. Panel A) Side-view photograph of D-HOP with $\Lambda=300$ nm. The arrow indicates the inverse opal structure surrounding the D-HOP. Panel B) Reflectance spectra of D-HOP measured under diffusive reflection mode with different detection angle ($\theta$), insert shows the diagram of diffusive reflection measurement system. Panel C) Schematic (left) and photographs (right) of reflected structural coloration on the grating and G-HOPs with $\Lambda=300$ nm at different angles. Panels D-F) Broad angle pattern display. Panels D-E) Shadow masks designs (left) and the corresponding photograph of patterned HOPs (right). A "silk" word (Panel D) and a tree (Panel E) pattern is created by selectively exposing part of D-HOP to UV light and PG-HOP to water vapor, respectively. Panel F) Schematic diagram and photographs of the PG-HOP with a tree pattern observed at the angles from 15° to 45°. $\theta$ is defined as viewing angle. The photographs of a silk inverse opal with a tree pattern observed at different angles are also shown for comparison. Scale bars: 2 mm.

FIG. 12(A-D) illustrate applications of the HOPs for sensing. Panels A-B) Colorimetric sensing in accordance with some embodiments of the present disclosure. Panel A) Stop-band response of a nine-layer D-HOP with $\Lambda=210$ nm to IPA-glycerol mixtures with varying compositions. Inserts show the structural color change when the glycerol concentration varies from $\Phi=0$ to $\Phi32$ 0.8. Panel B) Calculated stop-band central wavelength and intensity as a function of the volume fraction of glycerol, $\Phi$. Panel C, Panel D) Diffraction-based sensing. Panel C) Transmitted diffraction patterns of diffuser and D-HOPs immersed in different IPA-glycerol mixtures. Panel D) Relations between normalized diffraction intensity and the volume fraction of glycerol.

FIG. 13(A-D) illustrate example images of patterned hierarchical opals using ethyl acetate as the ink in accordance with embodiments of the present disclosure. Panel A) Direct and inverse patterns can both be created simply by changing printing files; Panel B) A 5 cm×5 cm coil pattern, in which the distance between printed lines is around 110 µm; Panel C) Series of thin lines; Panel D) Pixelated Lena patterned on SIO and SEM images of the Lena pattern. Boundary between destroyed and intact area can be distinguished.

FIG. 14(A-D) illustrate example images and graphs of QR code patterned on hierarchical opals by printing ethyl acetate in accordance with some embodiments of the present disclosure. Panel A) Patterned QR code on a piece of water-soluble free-standing SIO, which indicates the device's ability in message disclosure prevention; Panel B) Reversed QR pattern; Panel C) Normalized reflectance spectra of the original SIO and the ones that are WV treated. The central peak position changed from 600 nm (control) to 550 nm, 485 nm, and 445 nm after WV treatment for 1, 2, and 3 seconds respectively; and Panel D) Decipher process of WV treated B), the QR code is reversed and taken as the $1^{st}$ encryption layer, while the parts treated with WV are translated into key codes 796 according to the custom criteria set to RGB intensity. The scale bar is the same for (A), (B) and (D).

FIG. 15(A-E) illustrate example images, SEM images, and graphs of patterned hierarchical opals using MeOH/water mixture as ink in accordance with some embodiments of the present disclosure. Panel A) (a-f) are jumbos (1 cm in width) with different colors on 10-layer-SIO films by changing MeOH/water composition (firing volt: 25V, water %: 3, 3.5, 5, 9.5, 12, 18 respectively); Panel B) Cross section SEM images of 10-layer control, A(c) and A(f) (areas indicated in white square) to show structure shrinkage as a response to different amount of water; Panel C) Real reflectance spectra of 10-layer control and (a-f) respectively; Panel D) Linear relationship is shown between the water content in MeOH/water mix and peak wavelength of the reflective spectra demonstrated in C); Panel E) Butterfly pattern with two colors (body, veins and wing periphery) generated on a 10-layer-SIO film.

DETAILED DESCRIPTION

Among other things, the present disclosure provides biologically-based hierarchical opals, and specifically silk fibroin-based hierarchical opals, as well as methods of preparing the biologically-based hierarchical opals. Various embodiments according to the present disclosure are provided in detail herein.

Methods of Manufacturing Hierarchical Opals

Figure 1:
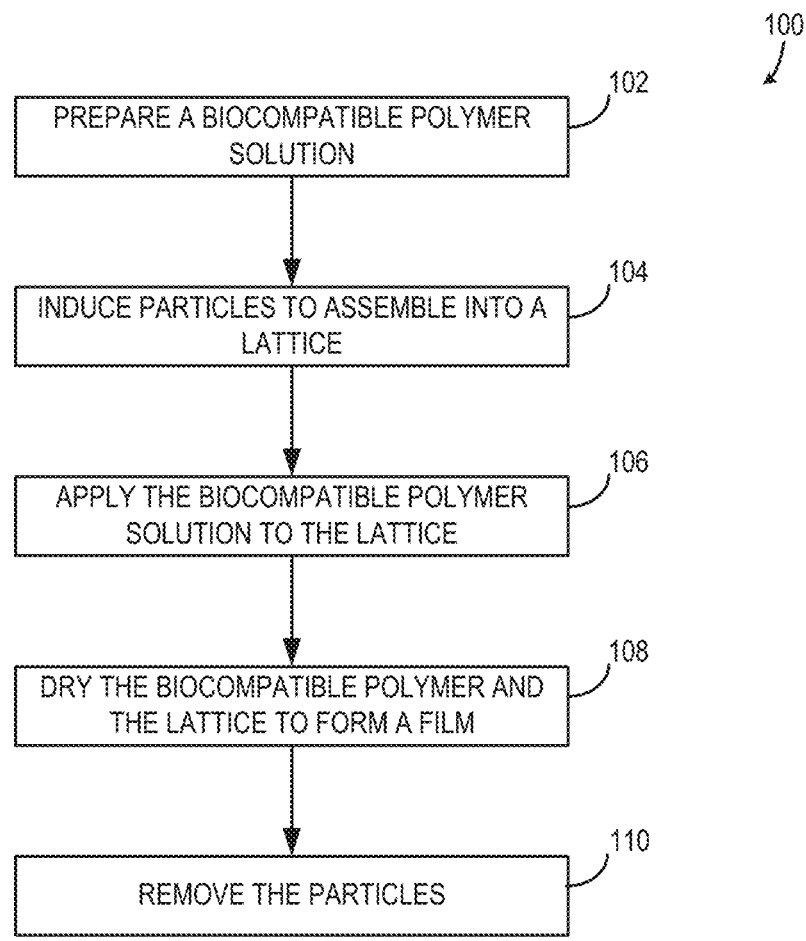
FIG. 1 is a flow chart illustrating an example method of forming a biologically-based hierarchical opal in accordance with some embodiments of the present disclosure.
Figure 2:
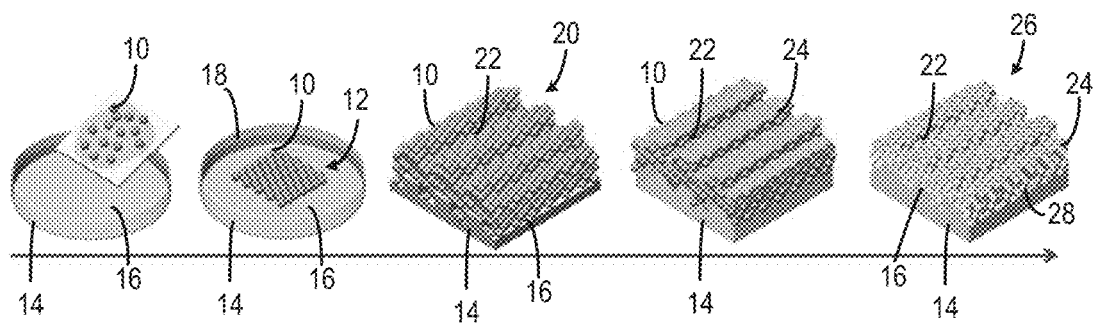
FIG. 2 is a schematic illustrating a non-limiting example method of forming the biologically-based hierarchical opal in accordance with some embodiments of the present disclosure. Left to right: introducing monodisperse polystyrene (PS) nanospheres to water surface; crystallization at the water/air interface; forming hierarchical PS colloidal crystals with controllable layers through layer-by-layer transferring the crystalline monolayer to patterned substrate; casting a biocompatible polymer solution into the template and drying to generate patterned biocompatible polymer/PS composite; removing PS nanospheres to attain hierarchical inverse colloidal crystal.

In some embodiments, the present disclosure provides a method of forming biologically-based hierarchical opals, and specifically silk fibroin-based hierarchical opals. Referring to FIGS. 1-2, an example method 100 for forming a biologically-based hierarchical opal 26 is illustrated in accordance with some embodiments of the present disclosure. The method 100 includes preparing a biocompatible polymer solution 102. The biocompatible polymer solution may include a biocompatible polymer at a concentration from 0.1% (w/w) to 50% (w/w), or from 1% (w/w) to 15% (w/w), or from 4% (w/w) to 10% (w/w) of the solution.

As indicated by step 104, the method 100 includes inducing a plurality of particles 10 to assemble into a lattice 12 (e.g., crystallized particles). The lattice 12 may be formed by applying a layer of particles 10 to a surface 16 of a substrate 14. In some embodiments, the particles 10 may be deposited onto the substrate 16 at a liquid/air interface 18. The liquid may be allowed to evaporate at ambient conditions to induce self-assembly and crystallization of the particles 10, or the liquid may be heated until the liquid is removed to yield the lattice 14. In some embodiments, the process of casting particles 10 onto the surface 16 of the substrate 14 is repeated by layer-by-layer deposition to form a hierarchical lattice 20. As used herein, the term "hierarchical" refers to a three-dimensional structure having a patterned surface (e.g., the surface of the hierarchical lattice 18 may comprise a plurality of grooves, ridges, and/or channels 22). In some embodiments, the hierarchical lattice 20 includes multiple layers of particles 10 (e.g., one layer, two layers, three layers, four layers, five layers, ten layers, twenty layers, fifty layers, one hundred layers, five hundred, or more).

As shown in FIG. 2, the surface 16 of the substrate 14 may be patterned with the hierarchical structure, for example, the surface 16 of the substrate 14 may include a plurality of grooves, ridges, and/or channels 22. By performing layer-by-layer deposition of particles 10 on the patterned substrate 14, the surface of the hierarchical lattice 20 may conform or substantially match the surface of the patterned substrate 14. In some embodiments, the hierarchical lattice 20 forms a negative imprint of the patterned surface of the substrate 14. Referring back to FIG. 1, the method 100 further includes a step 106 of applying the biocompatible polymer solution to the hierarchical lattice 20 such that the biocompatible polymer solution fills voids between the plurality of particles 10. The biocompatible polymer solution is then dried for a duration (e.g., 24 h at 25° C. and 30% relative humidity) to form a film 24 (e.g., biocompatible polymer/particle composite) that encloses the particles 10.

As indicated by step 110, the particles 10 are then removed, leaving periodic cavities or voids 28 in the film 24 to form a hierarchical opal 26 having a structural color. In some embodiments, the particles 10 comprise polystyrene particles or poly(methyl methacrylate) particles. The particles 10 may be removed by exposing the film 24 to an organic solvent that selective dissolves the particles 10, but does not dissolve the film 24. Suitable solvents include, but are not limited to, toluene or ethyl acetate. As used herein, the term "structural color" refers to colors caused by interference effects rather than by pigments. Structural color is caused by the interaction of light with structures of nanoscale periodic structure, with geometries on the order of magnitude of visible light wavelengths. Light that encounters these minute structures is subject to optical phenomena including thin film interference, multilayer interference, diffraction grating effects, photonic crystal effects, and light scattering. These phenomena lead to selective reflection of particular light wavelengths through constructive and destructive interference. In some embodiments, the biologically-based hierarchical opal 26 can be structurally manipulated to diffract light of a particular wavelength, resulting in perceived color. For example, the structural color may be adjusted based on a number of factors, including the diameter of the periodic cavities or voids 28 and a lattice constant. As used herein, the term "lattice constant" refers to a center-to-center distance of the periodic cavities 28 in the hierarchical opal 26.

In some embodiments, the particles 10 and periodic cavities 28 may have an average diameter that ranges from about 5 nm to about 2000 nm, or more. For example, the particles 10 and periodic cavities 28 may have an average diameter of at least about 5 nm, at least about 10 nm, at least about 15 nm, at least about 20 nm, at least about 25 nm, at least about 30 nm, at least about 35 nm, at least about 40 nm, at least about 50 nm, at least about 60 nm, at least about 70 nm, at least about 80 nm, at least about 90 nm, at least about 100 nm, at least about 125 nm, at least about 150 nm, at least about 175, at least about 200 nm, at least about 225 nm, at least about 250 nm, at least about 275, at least about 300 nm, at least about 325 nm, at least about 350 nm, at least about 375, at least about 400 nm, at least about 425 nm, at least about 450 nm, at least about 475, at least about 500 nm, at least about 525 nm, at least about 550 nm, at least about 575, at least about 600, at least about 650, at least about 700, at least about 750, at least about 800, at least about 850, at least about 900, at least about 950, at least about 1000, or more.

In some embodiments, the periodic cavities 28 may have an average diameter that is at most 2000 nm, or at most 1500 nm, or at most 1400 nm, or at most 1300 nm, or at most 1200 nm, or at most 1100 nm, or at most 1000 nm, or at most 900 nm, or at most 800 nm, or at most 700 nm, or at most 600 nm, or at most 500 nm, or less.

In some embodiments, the lattice constant of the hierarchical opal 26 may range from about 5 nm to about 2000 nm, or more. For example, lattice constant may be at least about 5 nm, or at least about 10 nm, or at least about 15 nm, at least about 20 nm, at least about 25 nm, at least about 30 nm, at least about 35 nm, at least about 40 nm, at least about 50 nm, at least about 60 nm, at least about 70 nm, at least about 80 nm, at least about 90 nm, at least about 100 nm, at least about 125 nm, at least about 150 nm, at least about 175, at least about 200 nm, at least about 225 nm, at least about 250 nm, at least about 275, at least about 300 nm, at least about 325 nm, at least about 350 nm, at least about 375, at least about 400 nm, at least about 425 nm, at least about 450 nm, at least about 475, at least about 500 nm, at least about 525 nm, at least about 550 nm, at least about 575, at least about 600, at least about 650, at least about 700, at least about 750, at least about 800, at least about 850, at least about 900, at least about 950, at least about 1000, at least about 1500, or at least about 2000 nm or more.

In some embodiments, the lattice constant of the hierarchical opal 26 may have an average diameter that is at most 2000 nm, or at most 1500 nm, or at most 1400 nm, or at most 1300 nm, or at most 1200 nm, or at most 1100 nm, or at most 1000 nm, or at most 900 nm, or at most 800 nm, or at most 700 nm, or at most 600 nm, or at most 500 nm, or less.

In some embodiments, the surface structure of the hierarchical opal 26 may be tunable and configured to induce a variety of optical effects including, but not limited to, iridescense, angle-independent coloration, polarization, complex color mixing, antireflection, ultra-blackness, ultra-whiteness, light focusing, and dynamic structural color. In additional to coloration, the grooves 22 on the surface structure of the hierarchical opal 26 may be configured to add further functional utility such as superwettability, selective vapor responses, light trapping, diffraction.

In some embodiments, the grooves, ridges, and/or channels 22 on the surface of the hierarchical opal 26 may be configured to define a diffractive optical element. As used herein, the term "diffractive optical element" may refer to a hierarchical opal 26 having a surface comprising grooves, ridges, and/or channels 22 arranged to selectively shape and/or separate wavelengths of incident light which operate by way of diffracting electromagnetic radiation. In some embodiments, the hierarchical opal 26 may include a surface that forms a diffractive optical element including, but not limited to, a diffuser, a pattern generator (i.e., an element that diffracts incoming light in a fashion designed to generate a specific pre-determined pattern, as would be understood by those having ordinary skill in the diffraction pattern transform art), a diffraction grating, a Fresnel lens, a micro lens, a beamsplitter, a hologram, and a phase plate. In some embodiments, only a fraction of the surface of the hierarchical opal 26 includes the diffractive optical element. In some embodiments, the entire surface of the hierarchical opal 26 includes the diffractive optical element. In some embodiments, the surface of the hierarchical opal 26 includes multiple diffractive optical elements (e.g., one optical element, two optical elements, five optical element, or more), which may be the same or different.

In some embodiments, the structure of the diffractive optical element is present in each layer of the lattice. For example, when the particles 10 are removed, each of the layers of periodic cavities that form in the absence of the particles 10 may each be in the form of the diffractive optical element.

In some embodiments, the method 100 of forming the hierarchical opal 26 includes forming a first hierarchical silk fibroin opal 26 having grooves, ridges, and/or channels 22 configured in at least one layer. The method 100 further includes coupling or adhering the first hierarchical silk fibroin opal to a second inverse opal though an adhesive layer. In some embodiments, the second inverse opal may include a surface that is flat or substantially flat. In some embodiments, the second inverse opal is a silk fibroin inverse opal. In some embodiments, the adhesive layer is an optically clear adhesive. In some embodiments, the adhesive layer comprises a layer of silk fibroin (e.g., silk fibroin film) that couples or adheres the first hierarchical silk fibroin opal 26 having grooves to the second inverse opal.

In some embodiments, the gratings be separated by a groove spacing. In some embodiments, the groove spacing in the hierarchical structure ranges from about 600 lines/mm to about 3600 lines/mm. In some cases, the groove spacing can be at least about 600 lines/mm, or at least about 700 lines/mm, or at least about 800 lines/mm, or at least about 900 lines/mm, or at least about 1000 lines/mm, or at least about 1100 lines/mm, or at least about 1200 lines/mm, or at least about 1300 lines/mm, or at least about 1400 lines/mm, or at least about 1500 lines/mm, or at least about 1600 lines/mm, or at least about 1700 lines/mm, or at least about 1800 lines/mm, or at least about 1900 lines/mm, or at least about 2000 lines/mm, or at least about 2100 lines/mm, or at least about 2200 lines/mm, or at least about 2300 lines/mm, or at least about 2400 lines/mm, or at least about 2500 lines/mm, or at least about 2600 lines/mm, or at least about 2700 lines/mm, or at least about 2800 lines/mm, or at least about 2900 lines/mm, or at least about 3000 lines/mm, or at least about 3100 lines/mm, or at least about 3200 lines/mm, or at least about 3300 lines/mm, or at least about 3400 lines/mm, or at least about 3500 lines/mm, or at least about 3600 lines/mm.

In some embodiments, the groove spacing in the hierarchical structure 26 is at most 3600 lines/mm, or at most about 3200 lines/mm, or at most about 2800 lines/mm, or at most about 2400 lines/mm, or at most about 2000 lines/mm, or at most about 1600 lines/mm, or at most about 1200 lines/mm, or less.

In some embodiments, the grooves, ridges, and/or channels 22 of the hierarchical opal 26 have a groove spacing or width that ranges from about 50 nm to about 30 μm. In some embodiments, the groove spacing or width may be at least about 50 nm, at least about 60 nm, at least about 70 nm, at least about 80 nm, at least about 90 nm, at least about 100 nm, at least about 125 nm, at least about 150 nm, at least about 175, at least about 200 nm, at least about 225 nm, at least about 250 nm, at least about 275, at least about 300 nm, at least about 325 nm, at least about 350 nm, at least about 375, at least about 400 nm, at least about 425 nm, at least about 450 nm, at least about 475, at least about 500 nm, at least about 525 nm, at least about 550 nm, at least about 575 nm, at least about 600 nm, at least about 650 nm, at least about 700 nm, at least about 750 nm, at least about 800 nm, at least about 850 nm, at least about 900 nm, at least about 950 nm, at least about 1000 nm, or more.

In some embodiments, the grooves, ridges, and/or channels 22 of the hierarchical opal 26 have a groove spacing or width that is at most 30 μm, or at most 25 μm, or at most 20 μm, or at most 15 μm, or at most 10 μm, or at most 5 μm, or at most 1000 nm, or at most 800 nm, or at most 600 nm, or at most 400 nm, or less.

In some embodiments, the groove spacing may be fixed. Alternatively, the groove spacing may be irregular (i.e., varies throughout along a dimension of the hierarchical opal 26).

In some embodiments, the grooves, ridges, and/or channels 22 of the hierarchical opal 26 have a groove depth or height that ranges from about 50 nm to about 1 μm. The groove depth or height may be defined as a distance or length from the top of the groove, ridge, or channel relative to a surface of the hierarchical opal 26. In some embodiments, the groove depth may be at least about 50 nm, at least about 60 nm, at least about 70 nm, at least about 80 nm, at least about 90 nm, at least about 100 nm, at least about 125 nm, at least about 150 nm, at least about 175, at least about 200 nm, at least about 225 nm, at least about 250 nm, at least about 275, at least about 300 nm, at least about 325 nm, at least about 350 nm, at least about 375, at least about 400 nm, at least about 425 nm, at least about 450 nm, at least about 475, at least about 500 nm, at least about 525 nm, at least about 550 nm, at least about 575 nm, at least about 600 nm, at least about 650 nm, at least about 700 nm, at least about 750 nm, at least about 800 nm, at least about 850 nm, at least about 900 nm, at least about 950 nm, or at least about 1000 nm.

In some embodiments, the grooves, ridges, and/or channels 22 of the hierarchical opal 26 have a groove depth or height that is at most 3 μm, or at most 2 μm, or at most 1 μm, or at most 800 nm, or at most 600 nm, or at most 400 nm, or less.

As used herein, the term "biocompatible polymer" refers to any polymeric material that does not deteriorate appreciably and does not induce a significant immune response or deleterious tissue reaction, e.g., toxic reaction or significant irritation, over time when implanted into or placed adjacent to the biological tissue of a subject, or induce blood clotting or coagulation when it comes in contact with blood.

Exemplary biocompatible polymers include, but are not limited to, a poly-lactic acid (PLA), poly-glycolic acid (PGA), poly-lactide-co-glycolide (PLGA), polyesters, poly(ortho ester), poly(phosphazine), poly(phosphate ester), polycaprolactone, gelatin, collagen, fibronectin, keratin, polyaspartic acid, alginate, chitosan, chitin, hyaluronic acid, pectin, polylactic acid, polyglycolic acid, polyhydroxyalkanoates, dextrans, and polyanhydrides, polyethylene oxide (PEO), poly(ethylene glycol) (PEG), triblock copolymers, polylysine, alginate, polyaspartic acid, silk fibroin, any derivatives thereof and any combinations thereof.

In some embodiments, the step 102 of preparing the biocompatible polymer solution 102 includes preparing an aqueous solution having the biocompatible polymer at a concentration from about 0.1% (w/w) to about 50% (w/w). In some embodiments, the biocompatible polymer is present at a concentration of from at least about 0.1% (w/w) to at least about 5% (w/w), or at least about 6% (w/w), or at least about 7% (w/w), or at least about 8% (w/w), or at least about 9% (w/w), or at least about 10% (w/w), or at least about 15% (w/w), or at least about 20% (w/w), or at least about 25% (w/w), or at least about 30% (w/w), or more.

In one non-limiting example, the biocompatible polymer is or comprises silk fibroin. Silk solutions may be prepared by boiling silk cocoons in an aqueous solution of $Na_2CO_3$ (e.g., at 0.2 M), and rinsing thoroughly with water to remove glue-like sericin proteins. Extracted silk is then dissolved in a solvent, for example, LiBr (e.g., at 9.3 M) solution. The solution is then dialyzed against distilled water to remove LiBr, which results in a final aqueous silk fibroin solution having silk fibroin present in the concentration that ranges between 0.1% (w/w) and 30% (w/w).

In some embodiments, the substrate 14 comprises an optically clear material. In some embodiments, the substrate is a silicone wafer. The substrate may be patterned with a grating structure including, but not limited to an echellete grating, a littrow grating, or a holographic grating.

In some embodiments, the step of preparing the biocompatible polymer solution 102 includes an additive at a concentration from 0.1% (w/w) to 30% (w/w). In some embodiments, the method 100 includes dispersing plasmonic particles in the solution. Suitable plasmonic particles or nanoparticles include, but are not limited to, gold, silver, ruthenium, rhodium, palladium, osmium, iridium, platinum, titanium, aluminum, nickel, fluorine, cerium, tin, bismuth, antimony, molybdenum, chromium, cobalt, zinc, tungsten, polonium, rhenium and copper.

In some embodiments, the method 100 further includes a step of locally tuning a photonic band gap in the hierarchical opal 26. Locally tuning the photonic band gap may include exposing a portion of the hierarchical opal 26 to water vapor exposure or ultra violet radiation exposure.

In some embodiments, water and/or moisture affects structural properties of silk. In some embodiments, interaction between silk proteins and water molecules leads either to beta-sheet formation when a film is exposed to water vapor or can cause material dissolution under certain conditions (i.e. an amorphous, alpha-helix dominated silk structure) if immersed in water.

In some embodiments, an ability to controllably affect silk structure is used, such as here, to tune a nanoscale lattice of the hierarchical opal 26. In some embodiments, when the hierarchical opal 26 are exposed to water vapor, structural color is gradually shifted with an increase of water vapor treating time though an alteration of the lattice constant in the target region. A color shift is shown to occur in a few seconds. In some embodiments, exposing provided silk inverse opals to water vapor includes exposing for about less than one second to about 5 seconds. In some embodiments, exposure times are less than 1 second, less than 2 seconds, less than 3 seconds, less than 4 seconds, less than 5 seconds, less than 6 seconds, less than 7 seconds, less than 8 seconds, less than 9 seconds, or about 10 seconds, or less. In some embodiments, water vapor exposure times are less than a time to cause material dissolution.

In some embodiments, exposing the provided silk inverse opals to water vapor includes exposing for at most ten minutes, or at most 9 minutes, or at most 8 minutes, or at most 7 minutes, or at most 6 minutes, or at most 5 minutes, or at most 4 minutes, or at most 3 minutes, or at most 2 minutes, or at most for one minute, or at most for 30 seconds, or at most 10 seconds, or less.

In some embodiments, silk structure in the hierarchical opal 26 is also affected by exposure to ultraviolet radiation. In some embodiments, defining structural color in the hierarchical opal 26 makes use of silk structure modification induced by exposure to ultraviolet radiation (UV).

In some embodiments, exposing provided the hierarchical opal 26 to ultra violet radiation, exposure times may range from about 15 minutes to about 5 hours. In some embodiments, exposure times are less than 15 minutes, less than 30 minutes, less than 45 minutes, less than 1 hour, less than 1.5 hours, less than 2 hours, less than 2.5 hours, less than 3 hours, less than 3.5 hours, less than 4 hours, less than 4.5 hours, less than 5 hours, less than 5.5 hours, less than 6 hours, less than 7 hours, less than 8 hours, less than 9 hours, less than 10 hours, or more. In some embodiments, ultra violet exposure times are less than a time to cause photo-degradation of silk fibroin.

In some embodiments, exposing the provided hierarchical opal 26 to ultra violet radiation includes exposing times of at most 24 hours, or at most 12 hours, or at most 10 hours, or at most 8 hours, or at most 6 hours, or at most 4 hours, or at most 2 hours, orat most 1 hour, or less.

In some embodiments, a mask or stencil is applied to the hierarchical opal 26 prior to application of the UV radiation or the water vapor to selectively expose target regions on the hierarchical opal 26. In this manner, patterns may be created on the hierarchical opal 26, where target regions have varied lattice constants relative to non-exposed regions.

In some embodiments, the hierarchical opal 26 is or comprises a silk fibroin hierarchical opal 26. At least a portion of the hierarchical opal 26 may be characterized by a percent beta sheet structure within the range of about 0% to about 45%. In some embodiments, silk fibroin-based hierarchical opals 26 are characterized by crystalline structure, for example, comprising beta sheet structure of about 1% (w/w), at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 16%, at least about 17%, at least about 18%, at least about 19%, at least about 20%, at least about 21%, at least about 22%, at least about 23%, at least about 24%, at least about 25%, at least about 26%, at least about 27%, at least about 28%, at least about 29%, at least about 30%, at least about 31%, at least about 32%, at least about 33%, at least about 34%, at least about 35%, at least about 36%, at least about 37%, at least about 38%, at least about 39%, at least about 40%, at least about 41%, at least about 42%, at least about 43%, at least about 44%, or at least about 45%. The beta sheet structure may be induced by exposing at least a portion of the hierarchical opal 26 to water vapor, UV radiation, or an organic solvent (e.g., methanol immersion).

In some embodiments, the hierarchical opal 26 includes a portion of the silk having a beta structure of at most 65% (w/w), or at most 60%, or at most 55%, or at most 50%, or at most 45%, or at most 40%, or at most 35%, or at most 30% (w/w).

Printing Hierarchical Opals

Figure 3:
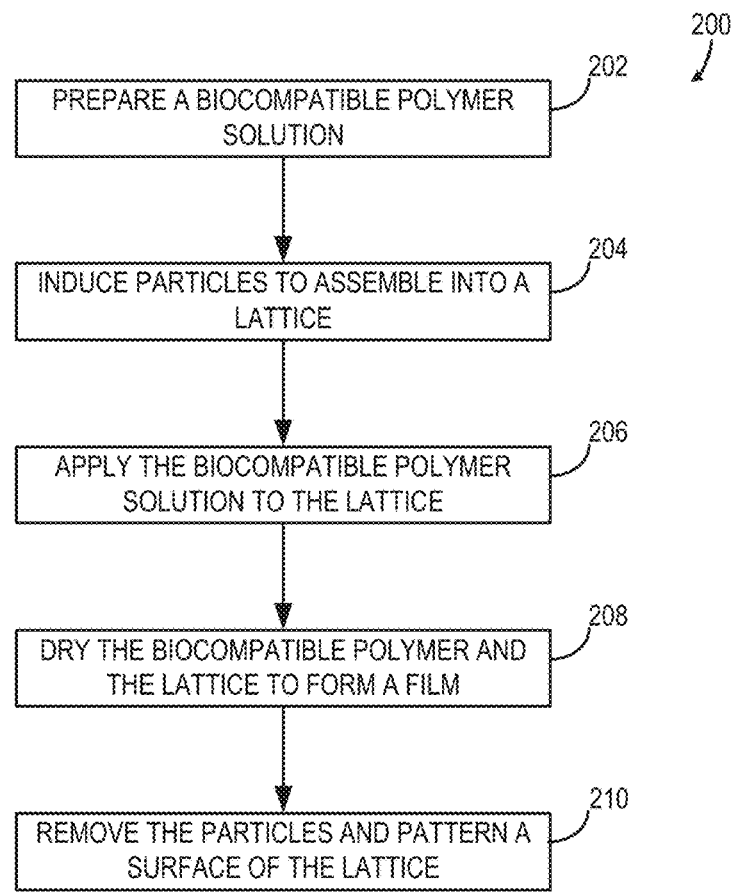
FIG. 3 is a flow chart illustrating an example method of forming a biologically-based hierarchical opal in accordance with some embodiments of the present disclosure.
Figure 4:
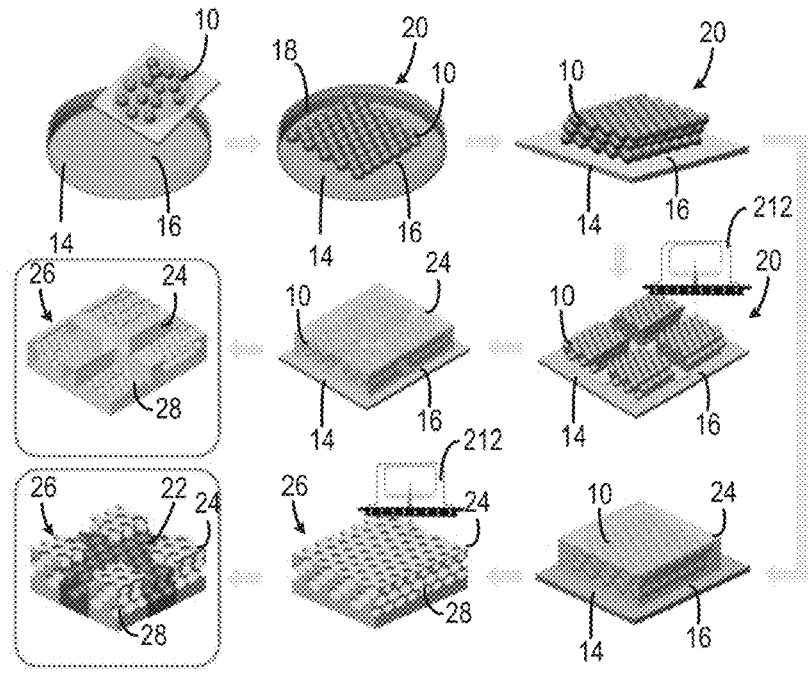
FIG. 4 is a schematic illustrating two printing patterning processes in accordance with some embodiments of the present disclosure. Top panel left: monodisperse PS spheres are introduced; Top panel middle: form a crystalline monolayer at the water/air interface; Top panel right: repeat steps to get a 3-layer stacked crystal structure; Middle panel right: ethyl acetate is deposited on PS structure by inkjet printing to locally dissolve PS beads as pattern designed; Middle panel middle: aqueous biocompatible polymer solution casting to form biocompatible polymer/PS composite; Middle panel left: patterned biologically-based hierarchical inverse opal is obtained by immersing the composite into toluene to dissolve and remove PS. Bottom panel: water/MeOH mix solution is deposited on the biologically-based hierarchical inverse opal to create grooves or a defected porous structure.

Referring to FIGS. 3-4, an example method 200 for forming a biologically-based hierarchical opal 26 is illustrated in accordance with some embodiments of the present disclosure. The method 200 includes preparing a biocompatible polymer solution 202. The biocompatible biocompatible polymer solution may include a biocompatible polymer at a concentration of 0.1% (w/w) to 30% (w/w), or from 1% (w/w) to 15% (w/w), or from 4% (w/w) to 10% (w/w) of the solution, and may be prepared as described with respect to method 100. As indicated by step 204, the method 200 includes inducing a plurality of particles 10 to self-assemble into a lattice 12 (e.g., crystallized particles) or a hierarchical lattice 20. The lattice 12 and the hierarchical lattice 20 may be produced as described with respect to method 100.

In some embodiments, the lattice 12 or the hierarchical lattice 20 may be patterned by applying (e.g., printing using a printer 212) a solution that selectively dissolves or removes at least a portion of the particles 20. The lattice 12 or the hierarchical lattice 20 may be patterned with the solution to form grooves, ridges, or channels 22 in the lattice 12 or the hierarchical lattice 20. The grooves, ridges, or channels 22 may be spaced in a fixed pattern across the surface, or varied irregularly to form a desired printed shape and/or pattern. The solution may comprise an organic solvent that dissolves the particles 10, such as toluene or ethyl acetate.

The method 200 further includes a step 206 of applying the biocompatible polymer solution to the hierarchical lattice 20 such that the biocompatible polymer solution fills voids between the plurality of particles 10. The biocompatible polymer solution is then dried for a duration (e.g., 24 h at 25° C. and 30% relative humidity) to form a film 24 (e.g., biocompatible polymer/particle composite) that encloses the particles 10. As indicated by step 210, the particles 10 are then removed (e.g., by selectively printing an organic solvent onto the film 24 using the printer 212), thereby leaving periodic cavities or voids 28 in the film 24 to form a hierarchical opal 26 having a structural color. The hierarchical opal 26 produced using method 200 may have the same properties as described with respect to method 100.

In some embodiments, the method 200 further includes a step of patterning the surface of the hierarchical opal 26. Patterning the surface of the hierarchical opal 26 may be achieved by printing a solution onto the surface of the hierarchical opal 26. Suitable solutions include solvents that dissolve the biocompatible polymer, or solvents that alter the lattice constant of the hierarchical opal 26 in the printed region, thereby forming grooves, ridges, and/or channels 22 on the surface of the hierarchical opal 26. Suitable solutions include, but are not limited to, aqueous solutions comprising an alcohol, such as methanol, ethanol, propanol, and butanol. In some embodiments, the alcohol is present at a concentration from about 1% (w/w) to about 10% (w/w).

In some embodiments, the grooves, ridges, and/or channels 22 generated using method 200 have a width that ranges from about 10 μm to about 1 mm. In some embodiments, the groove width or spacing may be at least about 10 μm, at least about 20 μm, at least about 30 μm, at least about 40 μm, at least about 50 μm, at least about 60 μm, at least about 70 μm, at least about 80 μm, at least about 90 μm, at least about 100 μm, at least about 125 μm, at least about 150 μm, at least about 175, at least about 200 μm, at least about 225 μm, at least about 250 μm, at least about 275, at least about 300 μm, at least about 325 μm, at least about 350 μm, at least about 375, at least about 400 μm, at least about 425 μm, at least about 450 μm, at least about 475, at least about 500 μm, at least about 525 μm, at least about 550 μm, at least about 575 μm, at least about 600 μm, at least about 650 μm, at least about 700 μm, at least about 750 μm, at least about 800 μm, at least about 850 μm, at least about 900 μm, at least about 950 μm, at least about 1000 μm, or more.

In some embodiments, the grooves, ridges, and/or channels 22 have a width that is at most 1.5 mm, or at most 1.4 mm, or at most 1.3 mm, or at most 1.2 mm, or at most 1.1 mm, or at most 1 mm, or at most 900 μm, or at most 800 μm, or at most 700 μm, or at most 600 μm, or less.

In some embodiments, the method 200 includes post processing the hierarchical opal 26 by exposing the hierarchical opal to water vapor or UV radiation, as described in method 100.

Apparatus

In some embodiments, the present disclosure provides a hierarchical opal 26, and specifically a silk fibroin hierarchical opal 26. The hierarchical opal 26 may be produced using the foregoing methods 100 and 200. In some embodiments, the hierarchical opal 26 exhibits structural color when exposed to incident electromagnetic radiation. The hierarchical opal 26 comprises periodic cavities 28 or voids separated by a lattice constant. The hierarchical opal 26 includes a surface having grooves, ridges, and/or channels 22.

In some embodiments, the periodic cavities 28 may have an average diameter that ranges from about 5 nm to about 2000 nm, or more. For example, the particles 10 and periodic cavities 28 may have an average diameter of at least about 5 nm, at least about 10 nm, at least about 15 nm, at least about 20 nm, at least about 25 nm, at least about 30 nm, at least about 35 nm, at least about 40 nm, at least about 50 nm, at least about 60 nm, at least about 70 nm, at least about 80 nm, at least about 90 nm, at least about 100 nm, at least about 125 nm, at least about 150 nm, at least about 175, at least about 200 nm, at least about 225 nm, at least about 250 nm, at least about 275, at least about 300 nm, at least about 325 nm, at least about 350 nm, at least about 375, at least about 400 nm, at least about 425 nm, at least about 450 nm, at least about 475, at least about 500 nm, at least about 525 nm, at least about 550 nm, at least about 575, at least about 600, at least about 650, at least about 700, at least about 750, at least about 800, at least about 850, at least about 900, at least about 950, at least about 1000, at least about 1500, or at least about 2000 nm or more. In some embodiments the periodic cavities have a spherical shape.

In some embodiments, the periodic cavities 28 may have an average diameter that is at most 2000 nm, or at most 1500 nm, or at most 1400 nm, or at most 1300 nm, or at most 1200 nm, or at most 1100 nm, or at most 1000 nm, or at most 900 nm, or at most 800 nm, or at most 700 nm, or at most 600 nm, or at most 500 nm, or less.

In some embodiments, the lattice constant of the hierarchical opal 26 may range from about 5 nm to about 2000 nm, or more. For example, lattice constant may be at least about 5 nm, or at least about 10 nm, or at least about 15 nm, at least about 20 nm, at least about 25 nm, at least about 30 nm, at least about 35 nm, at least about 40 nm, at least about 50 nm, at least about 60 nm, at least about 70 nm, at least about 80 nm, at least about 90 nm, at least about 100 nm, at least about 125 nm, at least about 150 nm, at least about 175, at least about 200 nm, at least about 225 nm, at least about 250 nm, at least about 275, at least about 300 nm, at least about 325 nm, at least about 350 nm, at least about 375, at least about 400 nm, at least about 425 nm, at least about 450 nm, at least about 475, at least about 500 nm, at least about 525 nm, at least about 550 nm, at least about 575, at least about 600, at least about 650, at least about 700, at least about 750, at least about 800, at least about 850, at least about 900, at least about 950, at least about 1000, at least about 1500, or at least about 2000 nm or more.

In some embodiments, the lattice constant of the hierarchical opal 26 may have an average diameter that is at most 2000 nm, or at most 1500 nm, or at most 1400 nm, or at most 1300 nm, or at most 1200 nm, or at most 1100 nm, or at most 1000 nm, or at most 900 nm, or at most 800 nm, or at most 700 nm, or at most 600 nm, or at most 500 nm, or less.

In some embodiments, the grooves, ridges, and/or channels 22 on the surface of the hierarchical opal 26 define a diffraction grating separated by a groove spacing. In some embodiments, the groove spacing in the hierarchical structure ranges from about 600 lines/mm to about 3600 lines/mm. In some embodiments, the groove spacing is at least about 600 lines/mm, or at least about 700 lines/mm, or at least about 800 lines/mm, or at least about 900 lines/mm, or at least about 1000 lines/mm, or at least about 1100 lines/mm, or at least about 1200 lines/mm, or at least about 1300 lines/mm, or at least about 1400 lines/mm, or at least about 1500 lines/mm, or at least about 1600 lines/mm, or at least about 1700 lines/mm, or at least about 1800 lines/mm, or at least about 1900 lines/mm, or at least about 2000 lines/mm, or at least about 2100 lines/mm, or at least about 2200 lines/mm, or at least about 2300 lines/mm, or at least about 2400 lines/mm, or at least about 2500 lines/mm, or at least about 2600 lines/mm, or at least about 2700 lines/mm, or at least about 2800 lines/mm, or at least about 2900 lines/mm, or at least about 3000 lines/mm, or at least about 3100 lines/mm, or at least about 3200 lines/mm, or at least about 3300 lines/mm, or at least about 3400 lines/mm, or at least about 3500 lines/mm, or at least about 3600 lines/mm.

In some embodiments, the groove spacing in the hierarchical structure 26 is at most 3600 lines/mm, or at most 3200 lines/mm, or at most 2800 lines/mm, or at most 2400 lines/mm, or at most 2000 lines/mm, or at most 1600 lines/mm, or at most 1200 lines/mm, or less.

In some embodiments, the grooves, ridges, and/or channels 22 of the hierarchical opal 26 have a groove spacing or width that ranges from 50 nm to 30 µm. In some embodiments, the groove spacing or width may be at least about 50 nm, at least about 60 nm, at least about 70 nm, at least about 80 nm, at least about 90 nm, at least about 100 nm, at least about 125 nm, at least about 150 nm, at least about 175, at least about 200 nm, at least about 225 nm, at least about 250 nm, at least about 275, at least about 300 nm, at least about 325 nm, at least about 350 nm, at least about 375, at least about 400 nm, at least about 425 nm, at least about 450 nm, at least about 475, at least about 500 nm, at least about 525 nm, at least about 550 nm, at least about 575 nm, at least about 600 nm, at least about 650 nm, at least about 700 nm, at least about 750 nm, at least about 800 nm, at least about 850 nm, at least about 900 nm, at least about 950 nm, at least about 1000 nm, or at least about 2 µm, or at least about 3 µm, or at least about 4 µm, or at least about 5 µm, or at least about 10 µm, or at least about 15 µm, or at least about 20 µm, or at least about 25 µm, or at least about 30 µm.

In some embodiments, the grooves, ridges, and/or channels 22 of the hierarchical opal 26 have a groove spacing or width that is at most 30 µm, or at most 25 µm, or at most 20 µm, or at most 15 µm, or at most 10 µm, or at most 5 µm, or at most 1000 nm, or at most 800 nm, or at most 600 nm, or at most 400 nm, or less.

In some embodiments, the grooves, ridges, and/or channels 22 have a width that ranges from about 10 µm to about 1 mm. In some embodiments, the groove width or spacing may be at least about 10 µm, at least about 20 µm, at least about 30 µm, at least about 40 µm, at least about 50 µm, at least about 60 µm, at least about 70 µm, at least about 80 µm, at least about 90 µm, at least about 100 µm, at least about 125 µm, at least about 150 µm, at least about 175, at least about 200 µm, at least about 225 µm, at least about 250 µm, at least about 275, at least about 300 µm, at least about 325 µm, at least about 350 µm, at least about 375, at least about 400 µm, at least about 425 µm, at least about 450 µm, at least about 475, at least about 500 µm, at least about 525 µm, at least about 550 µm, at least about 575 µm, at least about 600 µm, at least about 650 µm, at least about 700 µm, at least about 750 µm, at least about 800 µm, at least about 850 µm, at least about 900 µm, at least about 950 µm, at least about 1000 µm, or more.

In some embodiments, the grooves, ridges, and/or channels 22 have a width that is at most 1.5 mm, or at most 1.4 mm, or at most 1.3 mm, or at most 1.2 mm, or at most 1.1 mm, or at most 1 mm, or at most 900 µm, or at most 800 µm, or at most 700 µm, or at most 600 µm, or less.

In some embodiments, the groove spacing or width may be fixed. Alternatively, the groove spacing or width may be irregular (i.e., varies throughout along a dimension of the hierarchical opal 26).

In some embodiments, the grooves, ridges, and/or channels 22 of the hierarchical opal 26 have a groove depth or height that ranges from 50 nm to 1 µm. The groove depth or height may be defined as a distance or length from the top of the groove, ridge, or channel relative to a surface of the hierarchical opal 26. In some embodiments, the groove depth may be at least about 50 nm, at least about 60 nm, at least about 70 nm, at least about 80 nm, at least about 90 nm, at least about 100 nm, at least about 125 nm, at least about 150 nm, at least about 175, at least about 200 nm, at least about 225 nm, at least about 250 nm, at least about 275, at least about 300 nm, at least about 325 nm, at least about 350 nm, at least about 375, at least about 400 nm, at least about 425 nm, at least about 450 nm, at least about 475, at least about 500 nm, at least about 525 nm, at least about 550 nm, at least about 575 nm, at least about 600 nm, at least about 650 nm, at least about 700 nm, at least about 750 nm, at least about 800 nm, at least about 850 nm, at least about 900 nm, at least about 950 nm, or at least about 1000 nm.

In some embodiments, the grooves, ridges, and/or channels 22 of the hierarchical opal 26 have a groove depth or height that is at most 3 µm, or at most 2 µm, or at most 1 µm, or at most 800 nm, or at most 600 nm, or at most 400 nm, or less.

In some embodiments, the hierarchical opal 26 comprises from two to five-hundred layers of periodic cavities 28, or more. In some embodiments the hierarchical opal comprise at least 2 layers, at least 3 layers, at least 4 layers, at least 5 layers, at least 6 layers, at least 7 layers, at least 8 layers, at least 9 layers, at least 10 layers, at least 20 layers, at least 30 layers, at least 40 layers, at least 50 layers, at least 60 layers, at least 70 layers, at least 80 layers, at least 90 layers, at least 100 layers, or more.

In some embodiments, the hierarchical opal 26 comprises at most 1000 layers, or at most 800 layers, or at most 600 layers, or at most 400 layers, or at most 200 layers, or at most 100 layers, or at most 10 layers of periodic cavities 28.

In some embodiments, the hierarchical opal 26 is substantially free of organic solvent (e.g., toluene and/or ethyl acetate).

In some embodiments, the hierarchical opal 26 includes an additive at a concentration from 0.1% (w/w) to 30% (w/w). In some embodiments, hierarchical opal 26 includes plasmonic particles or nanoparticles include, but are not limited to, gold, silver, ruthenium, rhodium, palladium, osmium, iridium, platinum, titanium, aluminum, nickel, fluorine, cerium, tin, bismuth, antimony, molybdenum, chromium, cobalt, zinc, tungsten, polonium, rhenium and copper.

In some embodiments, the hierarchical opal 26 is or comprises a silk fibroin hierarchical opal 26. At least a portion of the hierarchical opal 26 may be characterized by a percent beta sheet structure within the range of about 0% to about 45%. In some embodiments, silk fibroin-based stents are characterized by crystalline structure, for example, comprising beta sheet structure of at least about 1%, at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 16%, at least about 17%, at least about 18%, at least about 19%, at least about 20%, at least about 21%, at least about 22%, at least about 23%, at least about 24%, at least about 25%, at least about 26%, at least about 27%, at least about 28%, at least about 29%, at least about 30%, at least about 31%, at least about 32%, at least about 33%, at least about 34%, at least about 35%, at least about 36%, at least about 37%, at least about 38%, at least about 39%, at least about 40%, at least about 41%, at least about 42%, at least about 43%, at least about 44%, or at least about 45%.

In some embodiments, the hierarchical opal 26 includes a portion of the silk having a beta structure of at most 65% (w/w), or at most 60%, or at most 55%, or at most 50%, or at most 45%, or at most 40%, or at most 35%, or at most 30% (w/w).

In some embodiments, the present disclosure provides a first hierarchical opal having a least one layer that forms grooves, ridges, and or channels 22 that is coupled to a second inverse opal through an adhesive layer. The second inverse opal may include a surface that is flat or substantially flat. In some embodiments, the second inverse opal is a silk fibroin opal. In some embodiments, the adhesive layer includes optically clear adhesive. In some embodiments, the adhesive layer includes silk fibroin (e.g., a silk fibroin film).

EXAMPLES

The following examples illustrate some embodiments and aspects of the disclosure. It will be apparent to those skilled in the art that various modifications, additions, substitutions, and the like can be performed without altering the spirit or scope of the disclosure, and such modifications and variations are encompassed within the scope of the disclosure as defined in the claims which follow. The following examples do not in any way limit the disclosure.

Example 1

Hierarchical Opal (HOP) Preparation:

In Example 1, a topographical templating strategy is provided for the fabrication of a biocompatible polymer-based, hierarchical 3D photonic. The provided biomaterials-based approach generates diffractive optics composed of nanophotonic lattices that allow simultaneous control over the reflection (through the photonic bandgap) and the transmission (through 2D diffractive structuring) of light with the additional utility of being constituted by a biocompatible, implantable, edible commodity textile material. The use of biocompatible polymers allows additional degrees of freedom in photonic bandgap design through directed protein conformation modulation. Demonstrator structures are presented to illustrate the lattice multifunctionality, including tunable diffractive properties, increased angle of view of photonic crystals, color-mixing, and sensing applications.

In Example 1, a hierarchical opal is provided that may be used in a variety of applications including, but not limited to, including sensing, displays, security, wetting, photovoltaics, aesthetics and others.

The HOP was prepared by using a template of polystyrene (PS) colloidal crystal on a topographically patterned substrate having a diffraction grating. A crystalline PS nanosphere monolayer at the water/air interface, generated through the direct self-assembly of PS nanospheres (diameters of 210 or 300 nm) is transferred onto pre-designed diffractive surfaces to form templated, close-packed PS colloidal crystal monolayers. The transfer process is repeated ultimately providing a template lattice with a controllable number of layers.

Briefly, a monodisperse PS sphere suspension (4%) was introduced to the water surface through using partially immersed hydrophilic Si wafer to form a floating monolayer. Then, large-scale close-packed monolayer array was formed at the water/air interface after removing the spheres immersed into the subphase of water and extra adding a few drops of sodium dodecyl sulfate (SDS). The polycarbonate micro and nanopatterned substrate (Digital Optics, Tessera Inc., San Jose, Calif.) attached to silicon wafer was immersed into the subphase to transfer the monolayer from the water surface. After repeating these procedures, hierarchical colloidal crystal multilayers were obtained.

The silk solution (30 min boil, 7 wt %-8 wt %) was prepared, and was added to the hierarchical colloidal crystal to fill all the air voids. The sample was set to dry for 24 h (25° C., 30% relative humidity) to form a free-standing patterned silk/PS composite film. The HOP film with thickness of ~50 μm was finally obtained after removing all the PS spheres in toluene. The resulting structures have three scale-dependent optical responses, namely (i) a photonic crystal behavior derived from the nanoscale periodicity of the optical lattice, (ii) the diffractive behavior from the microscale patterning and (iii) light gathering/processing ability derived from the multi-centimeter size of the devices.

Hierarchical opals were generated by using three kinds of templating diffractive optical elements: a diffuser (D), a pattern generator (PG), and a grating (G) (FIG. 5). The resulting HOPs are labeled as D-HOP, PG-HOP, and G-HOP to represent the 2D-diffusive/diffractive function associated with the photonic crystal lattice. Scanning electron microscope (SEM) images of the prepared silk HOPs are shown in FIG. 6(A-C). At the microscale, HOPs can fully replicate the microstructures of the corresponding substrate.

At the nanoscale, all hierarchical opals showed the ordered hexagonal arrays of air cavities (where the PS spheres were originally located) while displaying the ability to effectively replicate the surface patterns used as the template, as shown by the grating with d=600 lines/mm and groove depth of 450 nm observed in the AFM images and cross-section profiles (FIG. 5).

The mismatch between the dimension of the nanoparticles and the grating period can cause some edge irregularities in the end structures which results in the slight mismatch in depth and width of the colloidal assembly (FIG. 7). In this Example, the lattice constant ($\Lambda$), defined as the centre-to-centre distance of the air cavities, is the same as the diameter of PS sphere used, i.e. $\Lambda$=300 nm (FIG. 6) and $\Lambda$=210 nm (FIG. 7), respectively.

The cross-sectional SEM images of HOPs (FIG. 8) display the coexistence of microscale and nanoscale features with the patterned diffractive structure and the inverse photonic lattice both clearly visible. The fidelity of these free-standing constructs is enabled by the material characteristics of silk fibroin, which on top of its favorable optical properties (e.g., silk fibroin's robust mechanical properties and nanoscale processability). All the HOPs considered in this Example are three-layered inverse colloidal crystals with a lattice constant of 300/210 nm, unless otherwise noted.

The nanoscale periodic lattice structure of HOPs is responsible for the material's structural color as previously shown for silk inverse opals. The total reflectance spectra of both D-HOP and PG-HOP clearly show reflective stop-band peaks centered at $\lambda$=580 nm (FIG. 9A-B), and $\lambda$=420 nm (FIG. 10) for $\Lambda$=300 nm and $\Lambda$=210 nm, respectively. Expectedly, these high reflectance regions are more efficient with the increase of layer numbers of the inverse colloidal crystals (FIG. 11). The concomitant introduction of microscale patterns can not only modulate the structural color of HOPs, but maintain the performance of the diffractive optical elements with the added utility of the interplay between reflective and diffusive/diffractive functionality. The far-field diffraction patterns in both reflection and transmission obtained by propagating a laser beam through the HOPs are shown in FIG. 9(C-F) along with the AFM images of the inverse opals' diffractive surfaces. Additional functionality is illustrated in FIG. 9(G), which shows the images produced when an object (i.e. the word "Tufts" from an LCD display) is viewed through different HOPs. As shown in FIG. 9(H-I), the image is either defocused or diffracted by the D-HOPs and G-HOPs respectively, indicating the preservation of the optical function caused by the templating and replication of sub-micron topographies.

While the far-field intensity distribution of a diffractive optical element depends on its surface structure (e.g., height and periodicity), transparency, and effective refractive index, both the reflective and transmissive contributions can be modulated by tuning the photonic bandgap associated with the inverse colloidal crystal lattice. As such, the number of layers in the colloidal photonic crystal may determine the optical interplay in the HOP structures. The effect of the photonic crystal lattice on the diffractive properties of PG-HOPs and D-HOPs was evaluated FIG. 10(A) and FIG. 12(A-C) by comparing the far-field intensity of the diffracted orders of a HOP and an identical diffractive structure without the photonic crystal lattice.

The laser wavelength was selected to match the stop-band peak position to enhance the contribution due to the photonic crystal lattice. As shown in FIG. 10(B), the reflected diffraction intensity increases, while the transmitted diffraction intensity decreases in correspondence of the increase in the number of lattice layers due to the enhanced reflectivity from photonic crystal leading to higher diffraction efficiencies This is also illustrated in FIG. 10C, where the reflected first-order diffraction efficiency from G-HOPs increases when the stop-band matches the laser wavelength, while the transmitted diffraction efficiency decreases.

Tuning the stop-band of the photonic crystal introduces an additional degree of spectral selectivity on the diffractive structure that templates the lattice, which in turn can provide tunability and selectivity over the diffracted pattern from the structure. The influence of the lattice constant on the diffractive properties of HOPs was first examined by assembling hierarchical opals with different lattice constants $\Lambda$. Tuning the photonic lattice influences the extraction efficiency of specific wavelengths and allows one to enhance the intensity of diffracted spectral components in reflection when the laser wavelength matches the stop-band peak position.

This is confirmed by the measurements shown in FIG. 10D, where illumination by a blue laser ($\lambda$=405 nm) causes the structure with $\Lambda$=210 nm to display higher reflected diffraction intensity than the corresponding structure with $\Lambda$=300 nm, while reflected intensities are lower for the $\Lambda$=210 nm lattice compared to the structure with $\Lambda$=300 nm spacing when the structure is illuminated by a green laser ($\lambda$=543.5 nm). Expectedly, the transmitted diffraction intensities correlate with what observed above. Similarly, G-HOPs with $\Lambda$=210 nm show lower +$1^{st}$ order reflected diffraction efficiency and then higher transmitted diffraction efficiency than the corresponding structure with $\Lambda$=300 nm when illuminated by a green laser (FIG. 10C) due to the mismatched wavelength between laser and stop-band peak.

Example 2

Hierarchical Opal Post-Treatment

The reconfigurability of the photonic lattice by UV or water vapor allows further degrees of freedom in the design of 2D/3D optical structures allowing for multispectral optimization of the diffracted/transmitted/reflected spectral components and their interplay. FIG. 10(E-F) shows an example of hierarchical structures modulation caused by UV or water vapor treatment on the diffraction performance of the HOPs. One of the advantages of using biocompatible polymers, and specifically silk fibroin, is the ability to induce controllable conformational changes in the amorphous matrix of the material through the rearrangement of the fibroin molecular chains. This is achieved by using either UV or water vapor to modify the photonic lattice of silk inverse opal and allowing for programmable structural color tuning. This unique feature applies to the hierarchical opals presented here, where the same strategy can be adopted to provide photonic lattice tuning and further rational design of the material's spectral response.

In Example 2, VL-215.G UV germicidal lamps with the wavelength of 254 nm and intensity of 76 $\mu W\ cm^{-2}$ were used for UV irradiation. The distance between sample and UV lamp was set as 1 cm. Water vapor treatment was performed by directly exposing nanostructured surface of HOP to heated water surface (about 40° C.) with the distance between sample and water surface of 5 mm. For post-patterned HOP, stencils (i.e., masks) with designed shapes were applied on the surface of HOP film before UV or water vapor treatment to leave desired pattern on it after mask removal.

Conformational changes in the lattice result in controllable variations of the diffraction intensity, consistent with the associated change in reflection intensity because of photonic crystal lattice modulation FIG. 10(E-F). It is observed that while the lattice constant can be tuned, the surface micropatterns are almost unaffected after either UV or WV treatment, as confirmed by the surface SEM images.

The diffraction properties of the G-HOP structures when illuminated by a white light source are also shown in FIG. 10H, where the dispersed spectrum can be seen in several positive and negative diffractive orders. Compared to the plain grating, the transmitted diffraction patterns are affected by the photonic crystal transfer function which filters light in the stop-band. This is verified by analyzing the transmitted spectrum in the m=1 diffracted order, which shows a consistently lower transmitted intensity where the stop-band position of the inverse opal lattice is present with varying reflected intensity as a function of the number of layers in the photonic crystal lattice FIG. 10(I).

The interplay between the photonic bandgap and 2D diffusion/diffraction affects the overall iridescence of the structures, providing a strategy to enhance spectral selectivity in biocompatible polymer-based materials whose index contrast is low compared to inorganics and generally do not possess a complete photonic bandgap. This interplay has an impact on the reflected structural color at different angles. As an example, in the case of D-HOP/PG-HOP, the vivid yellow color is still visible as the viewing angle is changed from normal to oblique FIG. 11(A) in contrast with the unpatterned silk inverse opal (seen at the edge of each element), whose color is notably blue-shifted. The diffused reflectance spectra measurement (FIG. 11B) shows largely unchanged peak wavelengths as the observation angle is increases. This underscores the diffusive effect of the micropatterns that results in increased viewing angles for the nanoscale lattice's structural color.

Conversely, the color varies from blue to red with the increase of observation angle for a silk diffraction grating. This simple diffractive effect is altered by adding a photonic crystal lattice and by increasing the layer numbers of the photonic crystal. The observed structural color of a five-layer G-HOP is nearly unchanged beyond a certain angle, in contrast to the angle-dependent iridescence of a plain silk inverse opal. This provides another example of the coordinated effect between the angle-dependence of the 2D grating and the photonic crystal iridescence, with the structural color gradually dominating the response as the lattice gets larger with the increase of the number of assembled colloidal layers.

The integrated capacities to exhibit uniform structural color over a broad viewing angle and to locally reconfigure the structural colors and then design multicolor patterns make D-HOPs or PG-HOPs be potentials for wide-angle pattern displays. To demonstrate this, we first generated a multicolor "silk" word and tree pattern by selectively exposing part of HOP to UV and WV for different times and modulating the photonic crystal lattice constant to display patterned structural color, as shown in FIG. 11(D-E). A comparison between the PG-HOP with a tree pattern (FIG. 11F, top) shows little difference in structural color as the viewing angle increased from the normal, in contrast to an unpatterned silk inverse opal where the angle-dependence of structural colors is evident (FIG. 11F, bottom).

Example 3

Exemplary Apparatuses including Hierarchical Opals

The integrated capacities to exhibit uniform structural color over a broad viewing angle and to locally reconfigure the structural colors and then design multicolor patterns make D-HOPs or PG-HOPs be potentials for wide-angle pattern displays. To demonstrate this, we first generated a multicolor "silk" word and tree pattern by selectively exposing part of HOP to UV and WV for different times and modulating the photonic crystal lattice constant to display patterned structural color, as shown in FIG. 11(D-E). A comparison between the PG-HOP with a tree pattern FIG. 11F, top, shows little difference in structural color as the viewing angle increased from the normal, in contrast to an unpatterned silk inverse opal where the angle-dependence of structural colors is evident FIG. 11F, bottom.

Given the coexistence of spectrally responsive functions within a unique optical element, these structures offer interesting opportunities for sensing by combining the features of photonic crystals and diffractive optical elements. Typically, photonic-crystal based sensors work on monitoring stop-band spectral shifts, while diffractive optical elements-based sensors commonly rely on the analysis of far-field diffraction pattern changes in response to outside stimuli. In Example 3, HOPs allow for simultaneous monitoring of stop-band spectral shifts and diffracted orders, combining the utility of both approaches.

As an example, a D-HOP is used to monitor the refractive index (RI) changes of IPA-glycerol mixtures. FIG. 12(A) shows the reflectance change when the HOPs were immersed in IPA-glycerol mixtures with varying compositions. The performance of the sensor is shown in FIG. 12(B), which plots the wavelength and reflection intensity with different volume fraction of glycerol ($\Phi$). An increase of the concentrations of glycerol enhances the RI of the mixed solution and results in a red-shift of the stop-band, along with a decrease of reflection intensity, for both HOPs with different lattice constants. The diffraction patterns of D-HOPs as well as silk diffuser in different IPA-glycerol mixtures and the corresponding diffraction performance as a function of glycerol concentration are shown in FIG. 12(C-D). The diffraction intensity of D-HOP decreases with increasing glycerol concentration, the same as that of silk diffuser. This dual sensing based on stop-band (wavelength shift and relative intensity change) and diffraction (intensity change) can add utility for sensing applications, pending further research to improve selectivity and sensitivity.

These HOPs may be incorporated into implantable devices for biomedical applications, including biodegradation process and drug delivery monitoring. Moreover, the easy implementation of high reflectivity in specific wavelength (through increasing the layer numbers of inverse colloidal crystal) and high light diffusion makes the HOPs potentially as back reflectors of optoelectronic devices, such as photovoltaics, LED, and phototransistors, to enhance their performance through increasing light trapping and absorption within the devices. Finally, the protein feature of silk fibroin also enables these hierarchical structures to be readily transferred to other materials (such as Au, $Al_2O_3$, $TiO_2$ and so on) by removing the silk template at high temperature, further opening new path for photonic crystal-based optoelectronics applications.

Example 4

Printed Hierarchical Opal Preparation

In Example 4, an inkjet-printing based strategy for the generation of non-contact, rapid, direct approaches to create arbitrarily patterned photonic crystals is provided. The strategy is based on the use of water-soluble biocompatible polymer-based opal structures that can be reformed with high resolution through precise deposition of fluids on the photonic crystal lattice. The resulting digitally designed photonic lattice formats simultaneously exploit structural color and material transient opening avenues for applications including, but not limited to, information encoding, and combined functions of optics, biomaterials, and environmental interfaces in a single device. The patterned photonic crystals may also be utilized in sensors, color displays, optical devices, and anti-counterfeiting.

Two strategies are provided in Example 4 to generate patterned silk inverse opal (SIO) by using inkjet printing were developed, namely: (i) by printing ethyl acetate on polystyrene (PS) colloidal crystal multilayers to generate patterned template for silk infiltration and subsequent patterned inverse lattices, and (ii) by printing MeOH/water directly on inverse opal lattice for the generation of multispectral patterns.

To build the multilayer PhC template, three layers of PS colloidal crystals (300 nm in diameter) were assembled on a silicon wafer substrate using layer-by-layer transfer techniques, through which larger-scale, defect-free 3D colloidal photonic structures can be obtained. PS spheres self-assemble and form a crystalline monolayer floating on the surface after being introduced into water.

In the first approach, ethyl acetate is inkjet printed (Dimatix DMP-2831) on the 3-layer direct opal assembly thus dissolving the polystyrene assembly along the printed area. The patterned direct photonic lattice can then be used as template to fabricate an inverse opal structure by infiltrating pure silk solution, which after drying can be immersed in toluene to remove the PS spheres and the PS solute from printing.

In the second approach, a silk inverse opal lattice is used as the substrate while the inkjet printer cartridge is loaded with a mixture of methanol (MeOH) and water. This approach leverages the previously described ability of directing conformational changes in the silk protein lattice through humidity. Printing small volumes of water leads to localized variations in the lattice constant of the SIO, while and ultimately allows to "print" structural color by defining areas of different lattice constants through the water proportion in droplets deposited.

The use of the two approaches described above, allows for different mechanisms of structural color patterning. In first approach, direct dissolution of the direct opal lattice results in an inverse close-packed face-centered-cubic (fcc) lattice except for the printed areas where the ethyl acetate completely eliminates the lattice, resulting in regions without structural color.

This drawing strategy can be utilized to create both direct and inverse patterns as shown in FIG. 13(A). Inkjet printing provides the ability to tune the drop volume and spacing, the distance between printed lines, resulting in photonic features that can be controlled down to 30 μm in size as seen in FIG. 13(C). As a demonstration of the complexity of the patterns achievable, a digitized image file was printed onto the direct opal and then reproduced onto a silk film as an inverse opal FIG. 13(D). Analysis of the edges of the printed structures by scanning electron microscopy (SEM) shows the interface between the unaffected photonic lattice, exhibiting the ordered fcc-arrangement template by the PS nanospheres next to the patterned regions in which the lattice features are hardly and a smooth silk film surface is visible FIG. 13(D). A step of ~400 nm in height between the porous lattice structure and smooth surface is observed in the atomic force microscopy (AFM) image.

This type of patterning, combined with the ability of the biomaterial substrate to be reconfigured and interfaced with the environment that surrounds it, can be used to add functionality to photonic crystals lattices not only from a spectral perspective but also as an information encoding approach where the possibility to digitally define multispectral lattices onto a biologically compatible substrate could lend itself to added utility in encryption, storage, and security.

A simple demonstrator device in this context is a quick response (QR) code: first proposed in year 1994, and are ubiquitous with typical applications ranging from item identification, authentication, product/time tracking, and document management, to name a few. Compared with conventional barcodes, QR codes have more advantages including fast readability, high data storage capacity in small printed space, and resistance to dirt and damage. The ever-increasing use of personalized interfaces, such as smartphone cameras, to read/access digitized information, is driving the demand for even more sophisticated data storage, encryption, and security. For this purpose, advanced materials/structures, such as plasmonic filters, colloidal photonic crystals, upconverting nanoparticles, and metamaterials, have been utilized to expand on this platform.

Compared with conventional barcodes, QR codes have more advantages including fast readability, high data storage capacity in small printed space, and resistance to dirt and damage. The ever-increasing use of personalized interfaces, such as smartphone cameras, to read/access digitized information, is driving the demand for even more sophisticated data storage, encryption, and security. For this purpose, advanced materials/structures, such as plasmonic filters, colloidal photonic crystals, upconverting nanoparticles, and metamaterials, have been utilized to expand on this platform. Combining these three functions onto a single substrate it contemplated herein, and may provide utility for environmentally-dependent encryption and readout modalities.

The demonstrator device is generated by digitally printing a QR code onto a direct photonic lattice and then replicated by infiltration of silk fibroin solution to generate a freestanding, water-soluble SIO QR code. The resulting structure, shown in FIG. 14(A), preserves all the required details to be successfully scanned and read out with a smartphone. The inverse opal structure generated on the silk substrate offers an instantaneous way to exploit material transience and makes messages disappear as a function of protein conformation and assembly. Silk films can be controlled to have programmable solubility as a function of the physical crosslinks (i.e. prevalence of inter- vs. intramolecular bonds) presented in the material matrix.

In the example presented here, the silk substrate is assembled in its amorphous state and thus in a water soluble form. As a result, the spectral photonic lattice can be wiped out by a simple wet finger touch due to the sensitive response of the three-layer SIO structure (i.e. <1 μm) to localized humidity. The 50 μm-thick silk film, as the message carrier, can also be entirely dissolved within 10 seconds (with the QR code degrading in ~100 ms) by immersing the film in water (FIG. 14A). The rapid wipeout suggests the ability to have an environmentally interfaced tag with a specific photonic lattice spectral response that can react to localized humidity or can be dissolved on command by exposure to water.

It should be noted that though the water-soluble Silk I structure in amorphous silk can transform to the crystalline β-sheet structure (Silk II) through various types of treatments, the silk films demonstrated here can retain their amorphous structure and act as a reconfigurable message carrier with outstanding mechanical properties and flexibility for extended time.

In addition to simply fabricating a dissolvable QR code, the use of biocompatible polymer substrates allows to add additional layers of functionality to these constructs. It was previously demonstrated that in an amorphous silk-based inverse opal lattice, controlled exposure to water vapor (WV) can induce the rearrangement of free molecular chains in silk, thus leading to controllable vertical compression of photonic lattice itself, ultimately reconfiguring the spectral response of the photonic crystal. This strategy was adopted by generating a multispectral QR code by programming the photonic crystal lattice so that the three open squares in the QR encoding show distinct blue shifted color after WV treatment FIG. 14(B-D). Measurements of the corresponding reflectance spectra show that reflected peaks varying from 550, 485, to 445 nm compared with the untreated pattern (600 nm) when the treating time varies from 1, 2, to 3 s (FIG. 14C).

To decipher the messages encoded in FIG. 14D, two passwords are required and programmed in advance (i) the digital pattern scanned from the QR code ($1^{st}$ encryption layer) and (ii) a 3-digit structural color key encoded in the photonic crystal and decoded from the three open squares ($2^{nd}$ encryption layer). The raw image was processed into a binary image (i.e. black and white) by setting an intensity threshold, and then the colors were inverted to enable the camera scanning message retrieval ($1^{st}$ encryption layer). The differences in reflective spectra among the three open squares (FIG. 14C) can be read out in terms of RGB intensity, from which the $2^{nd}$ encryption layer is extracted. As shown in FIG. 3D, each square can be defined as a digit based on custom lookup table associated to the RGB intensity (e.g. the code extracted is 796 in this case). The 3-digit code can thus provide the key to accompany the QR code and decipher its message.

As previously demonstrated, the molecular rearrangement of silk fibroin can be controlled by inducing the protein's conformational transition and causing an associated compression of the SIO photonic lattice in the vertical direction. This enables patterning of the SIO through local changes in the lattice constant using the crosslinking solvent as a paint ink. To this end, MeOH/water mixtures with different water ratios were chosen as the ink to design multicolor patterned SIO. Different water proportions in the ink formulations result in varied increase in silk protein chains mobility, thus allowing for varied degrees of protein molecular chain rearrangement, which ultimately results in distinct volumetric changes of the silk matrix.

As shown in FIG. 15(A), six blue elephants with distinct differences in brightness were generated by inkjet printing MeOH/water mixtures with varied water ratio on a 10-layer SIO substrate. Variations in reflected color can be ascribed to the change in lattice constant as a result of vertical opal structure compression induced by the ink. Cross-sectional SEM images correlate the collapse of the nanoscale photonic lattice to a blueshift in the SIO's spectral response (FIG. 15B). As the inkjet droplets' water content increases from 5% (c) to 18% (f), the air cavities experience increased deformation showing a more oblate shape along the [111] direction, which leads to increased vertical compression of photonic lattices compared to the control sample.

As a result, the wavelength of reflection peak gradually blueshifts from 550 nm to 450 nm accompanied by a gradual decrease of reflectance intensity (FIG. 15C). Interestingly, the blue-shifted wavelength follows a linear relationship with the water volume ratio in the MeOH/water ink (FIG. 15D). This dependence of the reflection peak position on the water content enables local control of the structural color and multicolor pattern design. As a demonstration, a butterfly pattern with blue body and veins and dark blue wing periphery was generated (FIG. 15E) by using inks with different water contents.

With this strategy, patterns with arbitrary shape can be directly drawn on biocompatible polymer-based photonic structures at different brightness level, and more color choices can be expected by manipulating the canvas configuration and the ink formulation. Such patterns generated can be easily fixed by inducing physical crosslinking of the silk matrix with methanol treatment at ambient condition.

This example demonstrates the feasibility of using inkjet printing to achieve large-scale patterning on silk inverse opal photonic lattices in two contactless ways by (i) depositing ethyl acetate to locally generate defects on PS multilayer photonic templates for subsequent inverse opal, and (ii) depositing MeOH/water directly on SIO to achieve multispectral patterns.

In both approaches, direct and inverse pattern designs can be written on a water-soluble biocompatible polymer substrate avoiding the use of aggressive chemical reactions (e.g. surface wettability modification) or external stimuli (e.g. mechanical force, magnetic field, photolithography). By specifically taking advantage of silk fibroin's structural polymorphism such biophotonic lattice can undergo multispectral responses through molecular chain rearrangement allowing for interesting strategies for transient message encryption.

Other than being a digital deposition tool, inkjet printing technique also add utility by providing a reactive etching tool through controlled volume deposition and spatial interactions between the ink and the substrate by tuning ink composition, drop volume, and pattern alignment. The integration of optical functions, biomaterial interfaces, and digital writing techniques in a single device not only brings biophotonics into applications in color display and cryptography, but also gives provides insight for the use of inkjet printing as a synthesis tool in biomaterial engineering.

Polystyrene (PS) photonic crystal (PhC) template preparation: Three layers of PS sphere arrays on wafer were prepared. PS sphere suspension was introduced to the water surface and later scooping transferred with a 60-minute Tridecafluoro-1,1,2,2-tetrahydrooctyltrichlorosilane (FOTS) treated silicon wafer. By repeating the process for three times, a three-layer PS PhC structure was created and the colloids on the substrate remain close-packed after being transferred from water surface.

Silk fibroin solution preparation: Silk fibroin solution was prepared by cutting Bombyx mori silk cocoons, and boiling for 30 minutes in 0.02 M $Na_2CO_3$ to remove sericin. 9.3 M LiBr solution was added to the overnight-dried silk fibroin and stored at 60° C. to dissolve fibers into aqueous solution.

Pure silk solution (~6%) was collected after dialysis (Fisherbrand, MWCO 3.5K) for 48 hours.

Silk Inverse Opal (SIO) preparation: Silk solution was added to the patterned PS PhC template to fill the air voids. The sample was set to dry for 24 h (25° C., 30% relative humidity) to form a free-standing silk/PS composite film with the thickness of 50 μm. The PS spheres within the composite film were removed later by immersing the film into toluene for 24 h.

SIO patterning: Ethyl acetate (Fluka Analytical) was inkjet printed by a Dimatix Material Inkjet Printer (DMP-2831, equipped with cartridges with 21 μm nozzle diameter, FUJIFILM, Santa Clara, Calif., USA) using a custom designed waveform. Drop spacing was set as 20 μm, cartridge height was 500 μm, firing voltage 25V. MeOH/water ink was prepared as 3%, 3.5%, 5%, 9.5%, 12% and 18% in volume of water. All inkjet printing work was performed at room temperature (20-23° C.) with a relative humidity around 30%.

Water vapor treatment: The SIO was put on top of the heated water surface (about 40° C.) with the nanostructured side directly exposed to water vapor over a controlled time (1, 2, and 3 seconds). The distance between sample and water surface was set as 5 mm. Stencils with open squares were applied on the surface of SIO film to leave desired color after mask removal.

Lena pattern design: the pixelated image file "Lena" was first digitally created in MATLAB by reversing binary pixel values in the original "Lena" from 0 to 1 or vice versa in a random group of 5.

Test Methods

Diffraction Patterns Characterization

Diffracted patterns were obtained by propagating a blue (405 nm) or green (543.5 nm) laser through the silk 2D optical elements or HOPs. The distance between the sample and the projection plane was ~10 cm for recording transmitted diffraction patterns and ~30 cm for reflected diffraction patterns. For diffraction patterns of white light, the light from a fiber (core diameters of 400 μm) focused by a lens was directed toward samples. MATLAB was utilized to analyze the diffraction intensity. Relative diffraction intensity was utilized to evaluate the diffraction performance of HOPs, which is characterized by dividing the specific diffraction intensity of HOPs by the diffraction signal of control sample without inverse colloidal crystal.

Diffraction Efficiency Measurements

The grating or G-HOP is illuminated by HeNe laser with a wavelength of 543.5 nm (Melles Griot, IDEX Health & Science, LLC). The first-order diffraction signal ($I_{1st}$) was focused by a 5 cm focal length lens and measured by an optical power meter (PM100D, Thorlabs GmbH, Germany). Ten points were randomly picked and measured. The diffraction efficiency (DE) was calculated as:

$$DE = \frac{I_{1st} - I_{background}}{I_{incident} - I_{background}}$$

where the intensity of the incident beam ($I_{incident}$) was measured at position right before the sample. The background noise signal ($I_{background}$) was recorded when the laser is off, with other setups being intact.

Surface and Cross-Sectional Scanning Electron Microscope (SEM) Images

Surface and cross-sectional SEM images were acquired with a Zeiss Supra55VP. To analyze the cross-sectional structure, the samples were cleaved via cryofracture. AFM Images were obtained with a Cypher AFM (Asylum Research) in tapping mode using an Arrow UHF silicon probe (BRUKER, MPP-21120-10). Optical microscopy (BH-2, OLYMPUS) equipped with a camera (MicroPublisher 3.3 RTV, QImaging) was used to observe the structural color and surface morphology. UV-vis-NIR spectrophotometer (V-570, Jasco) combined with an integrating sphere (ISV-469, Jasco) was used to obtain total reflectance and transmittance spectra, while the specular reflectance and transmittance spectra, the diffused reflectance spectra and the diffraction spectra were collected using a fibre-optic spectrometer (USB-2000, Ocean Optics). The angle-resolved spectra were measured by fixing the incident light (normal to the sample surface) and adjusting the detection angle with respect to the surface normal.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A method of forming a hierarchical opal configured to separate wavelengths of light using a diffractive optical element, the method comprising the following steps:
   a) applying a silk fibroin solution to a lattice comprising one or more layers of a plurality of particles, the lattice forming a mold for the hierarchical opal having the diffractive optical element, wherein applying the silk fibroin solution fills voids between the plurality of particles;
   b) drying the silk fibroin solution into a composite material including the hierarchical opal and the plurality of particles; and
   c) removing the plurality of particles to form the hierarchical opal having the diffractive optical element formed on a surface of the hierarchical opal.

2. The method of claim 1, wherein step a) of the method further comprises:
   inducing a plurality of particles to assemble into the lattice on a surface of a substrate, the lattice having a surface that defines the diffractive optical element configured to separate wavelengths of light.

3. The method of claim 1, wherein the diffractive optical element comprises at least one of a Fresnel lens, a micro lens, a pattern generator, a diffuser, a diffraction grating, a beamsplitter, or a beam displacement optic.

4. The method of claim 2, wherein the surface of the substrate comprises a patterned surface.

5. The method of claim 4, wherein the diffractive optical element on the lattice is formed as a negative imprint of the patterned surface on the substrate.

6. The method of claim 1, wherein a structure of the diffractive optical element is present in each layer of the lattice.

7. The method of claim 1, wherein step c) further comprises forming a plurality of layers having periodic cavities that form in the space of the removed particles.

8. The method of claim 7, wherein a structure of the diffractive optical element is present in each of the plurality of layers having the periodic cavities.

9. The method of claim 1, wherein the particles comprise polystyrene or poly(methyl methacrylate) nanoparticles.

10. The method of claim 1, wherein the particles have an average diameter from about 100 nm to about 600 nm.

11. The method of claim 2, further comprising performing layer-by-layer deposition to form a groove having a groove depth from about 50 nm to 1 μm in the surface of the lattice.

12. The method of claim 1, wherein the step c) further comprises forming a lattice constant in a range from 100 nm to 600 nm in the lattice.

13. The method of claim 1, wherein the step c) further comprises immersing the lattice in an organic solvent.

14. The method of claim 1, wherein the silk solution includes dispersed plasmonic nanoparticles in the silk solution, wherein the dispersed plasmonic nanoparticles are selected from the group consisting of gold, silver, ruthenium, rhodium, palladium, osmium, iridium, platinum, titanium, aluminum, nickel, fluorine, cerium, tin, bismuth, antimony, molybdenum, chromium, cobalt, zinc, tungsten, polonium, rhenium and copper.

15. The method of claim 3, wherein the diffraction grating comprises an echellete grating, a littrow grating, or a holographic grating on the surface of the lattice.

16. The method of claim 1 further comprising:
exposing at least a portion the hierarchical opal to water vapor or ultraviolet radiation for a duration,
wherein the duration is optionally sufficient to alter the photonic band gap of the at least a portion of the hierarchical opal,
wherein the duration of exposing the hierarchical opal to water vaper is optionally from about 1 second to about 10 seconds,
wherein the duration of exposing the hierarchical opal to ultraviolet radiation is optionally from about 1 second to about 5 hours, and
wherein the duration is sufficient to induce a beta-sheet content in the silk fibroin from 20% to 45% (w/w).

17. The method of claim 1, wherein the diffractive optical element comprises grooves on a surface of the hierarchical opal having a width that ranges from 100 nm to 1 μm.

18. A method of forming a hierarchical opal, the method comprising:
a) applying a silk fibroin solution to a lattice comprising a plurality of particles such that the silk fibroin solution fills voids between the plurality of particles;
b) drying the silk fibroin solution into a composite material including the hierarchical opal and the plurality of particles;
c) removing the plurality of particles to form the hierarchical opal comprising nanoscale periodic cavities separated by a lattice constant; and
d) applying an aqueous solution to a surface of the hierarchical opal in a patterned formation, wherein the aqueous solution alters the lattice constant of the nanoscale periodic cavities located in the patterned formation to generate grooves across the surface of the hierarchical opal.

19. An apparatus comprising:
a hierarchical silk fibroin opal that exhibits structural color when exposed to incident electromagnetic radiation, the hierarchical silk fibroin opal comprising nanoscale periodic cavities separated by a lattice constant, wherein the hierarchical silk fibroin opal includes a surface having grooves.

20. The apparatus of claim 19 further comprising:
a first hierarchical silk fibroin opal having at least one layer that forms the grooves in the first hierarchical silk fibroin opal; and
a second inverse opal coupled to the first hierarchical silk fibroin opal through an adhesive layer.

21. The method of claim 18, wherein the aqueous solution comprises an alcohol.

22. The method of claim 18, wherein d) includes printing the silk fibroin solution across the surface of the hierarchical opal.

23. The method of claim 18, wherein the step c) further includes printing an organic solution onto the hierarchical opal.

24. The apparatus of claim 19, wherein at least a portion of the grooves have a groove depth of 50 nm or greater.

25. The apparatus of claim 19, wherein the grooves form a diffractive optical element on the surface of the hierarchical silk fibroin opal.

26. The apparatus of claim 19, wherein the grooves have a width that ranges from 100 nm to 30 μm.

27. The apparatus of claim 19, wherein the grooves have a width that is greater than 30 μm.

28. The apparatus of claim 19, wherein the hierarchical silk fibroin opal has an average lattice constant in a range of between 100 nm and 600 nm.

29. The apparatus of claim 19, wherein at least one dimension of the apparatus is greater than one centimeter.

30. The apparatus of claim 19, wherein the apparatus comprises multiple layers of nanoscale periodic cavities.

31. The apparatus of claim 19, wherein a lattice constant for at least some of the nanoscale periodic cavities of the hierarchical silk fibroin opal are smaller in a vertical direction following exposure to water vapor or ultra violet radiation.

32. The apparatus of claim 19 further comprising:
a first hierarchical silk fibroin opal having at least one layer that forms the grooves in the first hierarchical silk fibroin opal; and
a second inverse opal coupled to the first hierarchical silk fibroin opal through an adhesive layer.

* * * * *